United States Patent
Soeda

(10) Patent No.: US 11,195,357 B2
(45) Date of Patent: *Dec. 7, 2021

(54) SUPPLY CHAIN SYSTEM AND NON-TRANSITORY COMPUTER-READABLE RECORDING MEDIUM STORING PROGRAM

(71) Applicant: PANASONIC INTELLECTUAL PROPERTY CORPORATION OF AMERICA, Torrance, CA (US)

(72) Inventor: Junichiro Soeda, Nara (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/584,340

(22) Filed: Sep. 26, 2019

(65) Prior Publication Data

US 2020/0020187 A1 Jan. 16, 2020

Related U.S. Application Data

(63) Continuation of application No. 16/011,681, filed on Jun. 19, 2018.
(Continued)

(30) Foreign Application Priority Data

Mar. 14, 2018 (JP) .............................. JP2018-046308

(51) Int. Cl.
*B60R 25/24* (2013.01)
*B60P 7/13* (2006.01)
(Continued)

(52) U.S. Cl.
CPC ............ *G07C 9/00571* (2013.01); *B60P 7/13* (2013.01); *E05B 19/0005* (2013.01);
(Continued)

(58) Field of Classification Search
CPC .................... G07C 9/00571; G07C 9/00174
See application file for complete search history.

(56) References Cited

U.S. PATENT DOCUMENTS 5,223,829 A * 6/1993 Watabe ................ A47G 29/141
235/382.5
8,943,187 B1 1/2015 Saylor
(Continued)

FOREIGN PATENT DOCUMENTS

JP 54-032507 U 3/1979
JP 2002-216046 8/2002
(Continued)

OTHER PUBLICATIONS

Merriam-Webster, Definition of "distributed" in the field of computing located at https://www.merriam-webster.com/dictionary/distributed. Accessed Oct. 26, 2020. (Year: 2020).*
(Continued)

*Primary Examiner* — Emily C Terrell
*Assistant Examiner* — Pameshanand Mahase
(74) *Attorney, Agent, or Firm* — Greenblum & Bernstein, P.L.C.

(57) ABSTRACT

Various devices, methods, and media are provided. According to one of the devices, an unlocking request for unlocking a lock is received. The lock is provided in a container and contains a physical object. Information of a first owner, that has a right of ownership of the physical object, is acquired from a first ledger when the unlocking request is received. The first ledger is one of a plurality of distributed ledgers which each have a same content. The device determines
(Continued)

whether the first requester matches the first owner, and causes the lock to be unlocked when the first requester matches the first owner.

22 Claims, 18 Drawing Sheets

Related U.S. Application Data

(60) Provisional application No. 62/530,541, filed on Jul. 10, 2017.

(51) Int. Cl.
| | | |
|---|---|---|
| *G06Q 50/28* | (2012.01) | |
| *G06Q 50/04* | (2012.01) | |
| *G07C 9/00* | (2020.01) | |
| *E05B 19/00* | (2006.01) | |
| *H04L 29/08* | (2006.01) | |
| *H04L 9/06* | (2006.01) | |
| *G06Q 10/08* | (2012.01) | |

(52) U.S. Cl.
CPC ....... *G06Q 10/083* (2013.01); *G06Q 10/0832* (2013.01); *G06Q 10/0833* (2013.01); *G06Q 10/0838* (2013.01); *G06Q 50/28* (2013.01); *G07C 9/00174* (2013.01); *G07C 9/00912* (2013.01); *H04L 9/0637* (2013.01); *H04L 67/1042* (2013.01); *G06Q 2220/00* (2013.01); *G07C 2009/0092* (2013.01); *G07C 2009/00825* (2013.01)

(56) References Cited

U.S. PATENT DOCUMENTS

| | | | |
|---|---|---|---|
| 2002/0099620 A1 | 7/2002 | Ohta et al. | |
| 2004/0246097 A1* | 12/2004 | Queenan | G07C 9/00722 340/5.61 |
| 2006/0139147 A1* | 6/2006 | Sterzinger | E05G 1/005 340/5.72 |
| 2007/0090921 A1* | 4/2007 | Fisher | G07C 9/00103 340/5.73 |
| 2007/0203727 A1* | 8/2007 | Moore | A45C 15/00 705/500 |
| 2008/0059338 A1* | 3/2008 | Hubbard | G06Q 10/08 705/28 |
| 2008/0294488 A1 | 11/2008 | Gupta et al. | |
| 2010/0326145 A1 | 12/2010 | Powers et al. | |
| 2017/0178072 A1 | 6/2017 | Poornachandran et al. | |
| 2019/0197471 A1* | 6/2019 | Endo | H04L 9/0872 |

FOREIGN PATENT DOCUMENTS

| | | |
|---|---|---|
| JP | 2006-336254 A | 12/2006 |
| JP | 2008-090831 A | 4/2008 |
| JP | 2012-014592 | 1/2012 |
| JP | 2015-138289 | 7/2015 |
| JP | 2016-197420 A | 11/2016 |
| JP | 2017-021522 | 1/2017 |
| JP | 2017-050763 | 3/2017 |
| KR | 2007114483 A | 12/2007 |
| WO | 2005/098696 | 10/2005 |
| WO | 2006/027867 A1 | 3/2006 |
| WO | 2006/119123 | 11/2006 |

OTHER PUBLICATIONS

Communication pursuant to Article 94(3) EPC from European Patent Office (EPO) dated Sep. 20, 2019 for the related European Patent Application No. 18181860.0.

The Extended European Search Report from the European Patent Office (EPO) dated Sep. 11, 2018 for the related European Patent Application No. 18181860.0.

\* cited by examiner

FIG. 8

| | SITUATION 1 | SITUATION 2 | SITUATION 3 | SITUATION 4 |
|---|---|---|---|---|
| TRANSACTION USER | PRODUCER | AGENT | PURCHASER (CUSTOMER) | PURCHASER (CUSTOMER) |
| RIGHT OF OWNERSHIP (RIGHT TO OPEN) | PRODUCER | AGENT | PURCHASER (CUSTOMER) | PURCHASER (CUSTOMER) |
| OPENING HISTORY | NO | NO | NO | YES |
| ARTICLE INFORMATION | MELON | MELON | MELON | MELON |
| ARTICLE IDENTIFICATION INFORMATION | IDENTIFIER OF OBJECT STORAGE | IDENTIFIER OF OBJECT STORAGE | IDENTIFIER OF OBJECT STORAGE | IDENTIFIER OF OBJECT STORAGE |

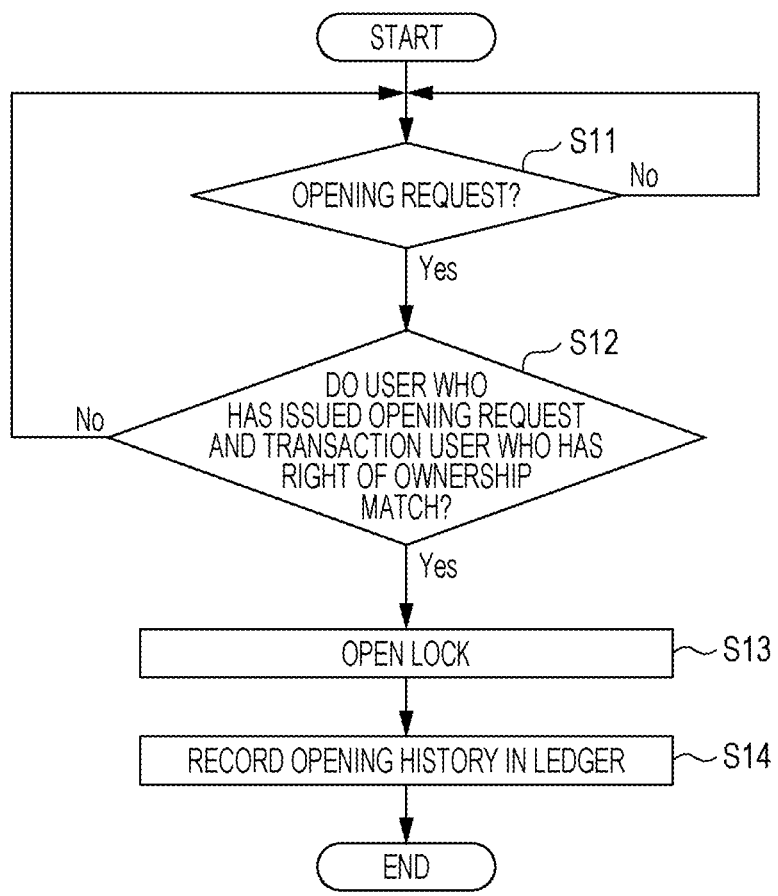

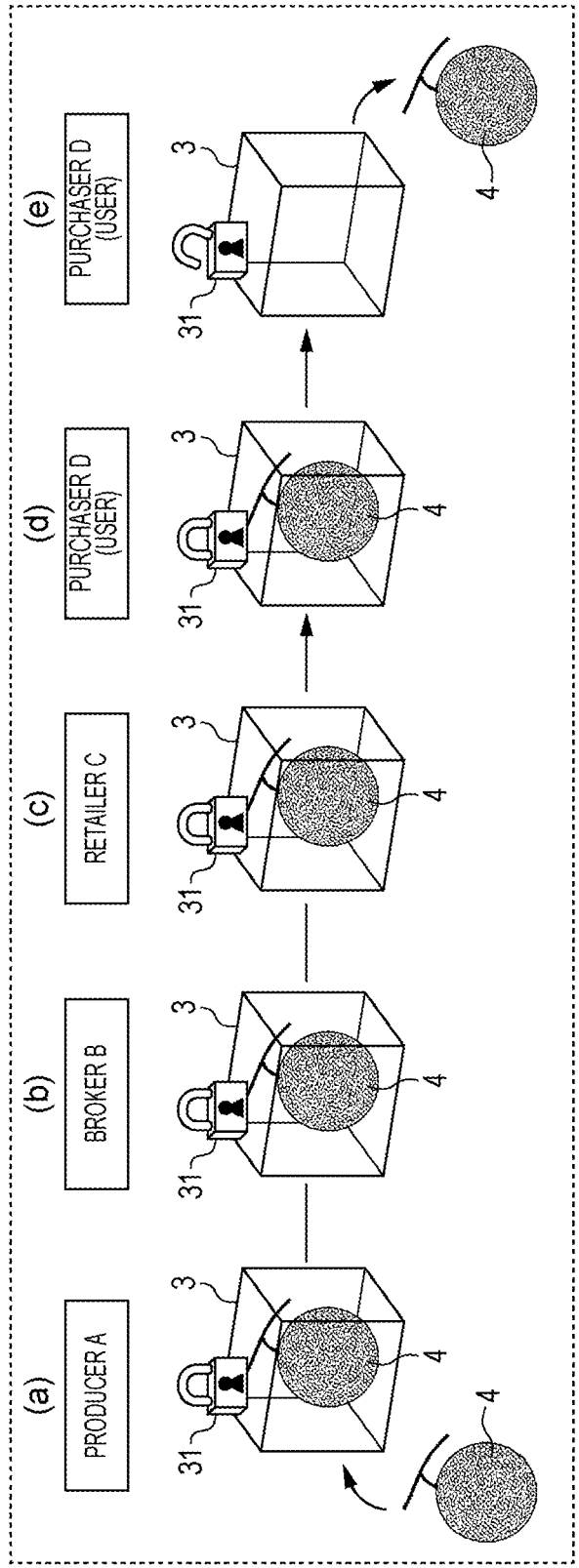

FIG. 15

| TRANSACTION USER | ARTICLE | TRANSACTION |
|---|---|---|
| PRODUCER A | MELON F | REGISTRATION (OBJECT STORAGE 3) |
| PRODUCER A | MELON F | MOVEMENT OF RIGHT OF OWNERSHIP TO BROKER B |
| BROKER B | MELON F | MOVEMENT OF RIGHT OF OWNERSHIP TO RETAILER C |
| RETAILER C | MELON F | MOVEMENT OF RIGHT OF OWNERSHIP TO PURCHASER D |
| PURCHASER D | MELON F | OPENING OF LOCK (OBJECT STORAGE 3) |

SUPPLY CHAIN SYSTEM AND NON-TRANSITORY COMPUTER-READABLE RECORDING MEDIUM STORING PROGRAM

CROSS-REFERENCE TO RELATED APPLICATION

This is a continuation of U.S. patent application Ser. No. 16/011,681, filed Jun. 19, 2018, which claims the benefit of U.S. Provisional Pat. Appl. No. 62/530,541, filed Jul. 10, 2017, and priority to Japanese Pat. Appl. No. 2018-046308, filed Mar. 14, 2018. The disclosure of each of these documents, including the specification, drawings, and claims, is incorporated herein by reference in its entirety.

BACKGROUND

1. Technical Field

The present disclosure relates to a supply chain system and a non-transitory computer-readable recording medium storing a program.

2. Description of the Related Art

Unlawful acts such as false labeling of places of production of foods and imitations of paintings and the like are detected using traceability systems (e.g., refer to Japanese Unexamined Patent Application Publication No. 2015-138289).

Japanese Unexamined Patent Application Publication No. 2015-138289 discloses a traceability system capable of determining presence or absence of an unlawful act relatively easily.

SUMMARY

In Japanese Unexamined Patent Application Publication No. 2015-138289, however, image data regarding a product is only attached to a box storing the product, which is an actual object. That is, the actual object and the traceability system are connected to each other only through an identification label attached to the box storing the article, the identification label being used to check a history with the traceability system. With the technique disclosed in Japanese Unexamined Patent Application Publication No. 2015-138289, therefore, it is difficult to detect replacement of a product stored in a box by a lower quality product of the same type and determine whether an unlawful act has been performed on an article.

One non-limiting and exemplary embodiment provides a supply chain system and a non-transitory computer-readable recording medium storing a program capable of determining whether an unlawful act has been performed on an article.

In one general aspect, the techniques disclosed here feature a supply chain system including server that manages at least a right of ownership of an article, the article being an actual object, a container that is provided with a lock, the lock being configured to at least open through an electronic process, the container being capable of physically storing the article, and at least one of a processor or a circuit that, when an opening request to open the lock is received, determines whether a user who has issued the opening request and a user who has the right of ownership of the article match. When the user who has issued the opening request and the user who has the right of ownership of the article match, the lock is opened for allowing the article to be removed from the container, and the server is notified that the lock has been opened.

With the supply chain system and the like in the present disclosure, whether an unlawful act has been performed on an article can be determined.

It should be noted that general or specific embodiments may be implemented as a system, a method, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating transaction users, a right of ownership, and opening histories, and the like with respect to an article in a situation illustrated in FIG. 7;

FIG. 9 is a flowchart illustrating an example of a characteristic operation performed by the supply chain system according to the embodiment;

FIG. 12 is a diagram conceptually illustrating the operation of a supply chain system according to a first modification;

FIG. 15 is a diagram conceptually illustrating another example of the structure of data recorded in the ledger according to the first modification;

DETAILED DESCRIPTION

Figure 1:
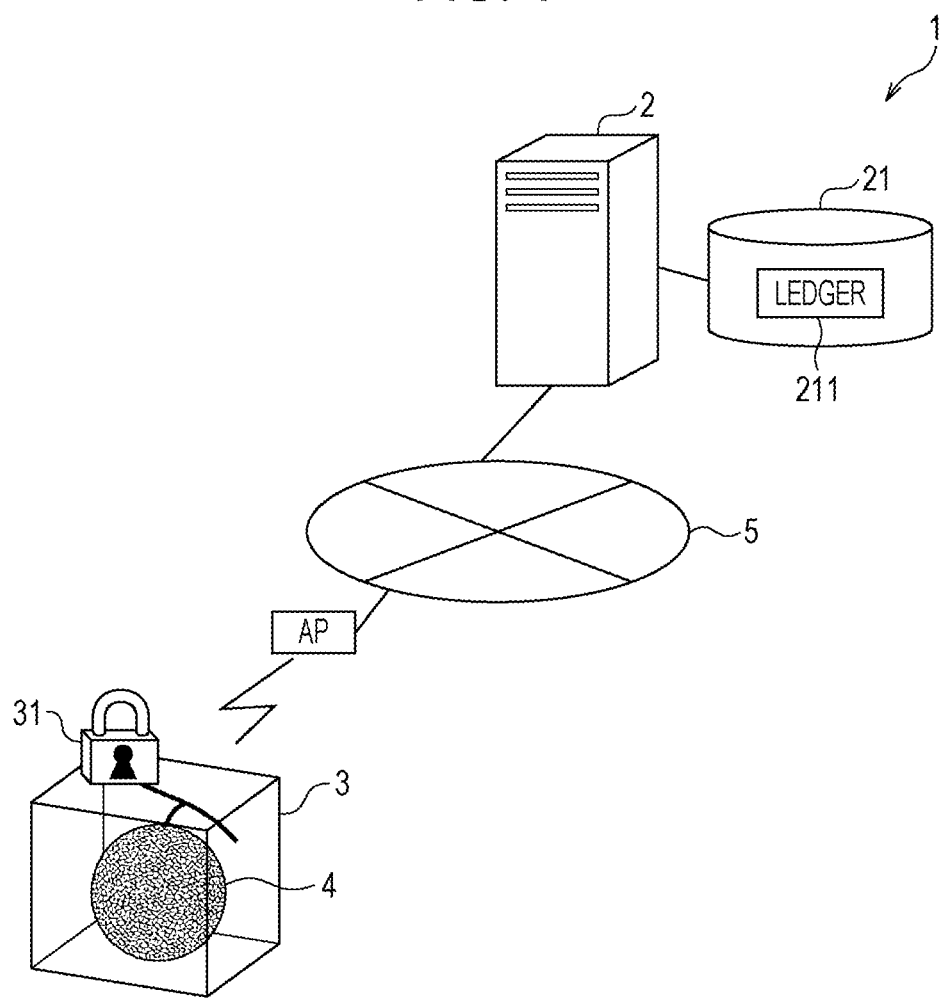
FIG. 1 is a diagram illustrating an example of the configuration of a supply chain system according to an embodiment.

Underlying Knowledge Forming Basis of Present Disclosure

A supply chain system according to an aspect of the present disclosure includes a server that manages at least a right of ownership of an article, the article being an actual object, a container that is provided with a lock, the lock being configured to at least open through an electronic process, the container being capable of physically storing the article, and at least one of a processor or a circuit that, when an opening request to open the lock is received, determines whether a user who has issued the opening request and a user who has the right of ownership of the article match. When the user who has issued the opening request and the user who has the right of ownership of the article match, the lock is opened for allowing the article to be removed from the container, and the server is notified that the lock has been opened.

With this configuration, the article stored in a physically locked object storage is distributed. When the lock provided for the object storage has not been opened, therefore, it can be seen that the article stored in the object storage has not been tampered with. That is, with this configuration, whether an unlawful act has been performed on the article can be determined. Furthermore, with this configuration, unlawful acts performed on the article, such as false labeling of a place of production of the article, can be suppressed, and cost efficiency can be achieved because there is no need to dispose of articles whose places of production have been falsely labeled.

The container may notify, through wireless communication, the server that the lock has been opened. Upon receiving a notification, the server may manage an opening history of the lock by adding an opening of the lock to the opening history.

With this configuration, whether the lock of the object storage storing the article has been opened can be determined. When the lock has not been opened at all until a user who consumes or uses the article opens the lock and removes the article, therefore, it can be seen that the article stored in the object storage has not been tampered with. Consequently, whether an unlawful act has been performed on the article can be determined more accurately.

In addition, for example, the server, when a change request to change the right of ownership of the article is received, may perform an authentication process to determine whether a user who has issued the change request is the user who has the right of ownership. The server may manage the right of ownership of the article by accumulating change of the right of ownership of the article as a history. After the server performs the authentication process, the server may accumulate the change of the right of ownership of the article as the history by recording a user to which the right of ownership of the article has been granted.

Here, for example, the container may be a transparent case, an opaque latticed case, or a barred case.

In addition, for example, the container may further include a sensor for detecting a storage state of the article. The container may wirelessly transmit, to the server, information indicating the storage state of the article detected by the sensor. The sever may manage a storage state history of the article by accumulating the information indicating the storage state of the article transmitted from the container.

The sever may manage the right of ownership of the article by accumulating, as a history, change of the right of ownership of the article in distributed ledgers including a plurality of ledgers of same content constructed on a blockchain platform and manages the opening or the fastening of the lock as a history. The lock may be configured to open and fasten. The container may notify, through wireless communication, the server that lock has been opened or fastened. Upon receiving a notification, the server may manage an opening and fastening history of the lock by adding an opening or fastening of the lock to the opening and fastening history. The supply chain system may further include a lock manager configured to open and fasten the lock. The container may include the lock manager. The container may include the at least one of the processor or the circuit. The server may include the at least one of the processor or the circuit. According to another aspect of the present disclosure, a non-transitory computer-readable recording medium storing a program that, when executed by a computer, may cause the computer to perform operations comprising managing at least a right of ownership of an article, the article being an actual object, opening a lock of a container through an electronic process, the container being capable of physically storing the article, and determining, when an opening request to open the lock is received, whether a user who has issued the opening request and a user who has the right of ownership match. In the determining, when the user who has issued the opening request and the user who has the right of ownership managed match, the lock may be opened for allowing the article to be removed from the container, and a notification regarding an opening of the lock is issued. According to another aspect of the present disclosure, a method may include managing, by a server, at least a right of ownership of an article, the article being an actual object, opening a lock of a container through an electronic process, the container being capable of physically storing the article, and determining, by at least one of a processor or a circuit when an opening request to open the lock is received, whether a user who has issued the opening request and a user who has the right of ownership match. In the determining, when the user who has issued the opening request and the user who has the right of ownership managed match, the lock may be opened for allowing the article to be removed from the container, and a notification regarding an opening of the lock is issued. Embodiments that will be described hereinafter are specific examples of the present disclosure. Values, shapes, components, steps, the order of the steps, and the like mentioned in the following embodiments are examples, and do not limit the present disclosure. Among the components described in the following embodiments, ones not described in the independent claims, which define broadest concepts, will be described as arbitrary components. Any embodiment may be combined with another embodiment.

Embodiment

A supply chain system 1 according to the embodiment will be described hereinafter with reference to the drawings.
Configuration of Supply Chain System 1

FIG. 1 is a diagram illustrating an example of the configuration of the supply chain system 1 according to the present embodiment.

As illustrated in FIG. 1, the supply chain system 1 includes a server apparatus 2 connected to a storage device 21 and an object storage 3 provided with a lock 31. The server apparatus 2 and the object storage 3 are connected to each other through a network 5. The supply chain system 1 is a kind of traceability system, which is a mechanism for identifying the movement of an article 4 to be traced by keeping a record of the article 4. The article 4 is an actual object such as a product. The article 4 may be one of perishable foods including fruits such as a melon, aquatic products such as a fish, and livestock products such as a meat, or a processed food. Alternatively, the article 4 may be a one-of-a-kind item such as a painting or a jewel or an electronic device such as a game player.

The supply chain system 1 keeps a record of transactions conducted for the object storage 3 storing the article 4 and a record of opening and fastening of the lock 31 provided for the object storage 3. As a result, a possibility of a physical action taken on the article 4 stored in the object storage 3 can be detected, and whether an unlawful act has been performed on the article 4 can be determined.
Server Apparatus 2

Figure 2:
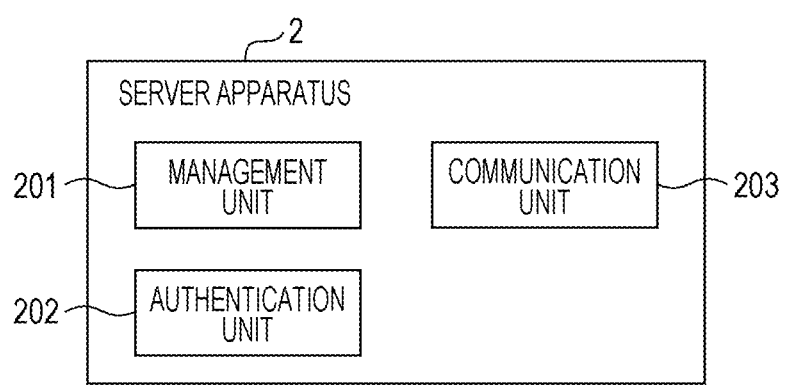
FIG. 2 is a block diagram illustrating an example of the configuration of a server apparatus illustrated in FIG. 1.
Figure 3:
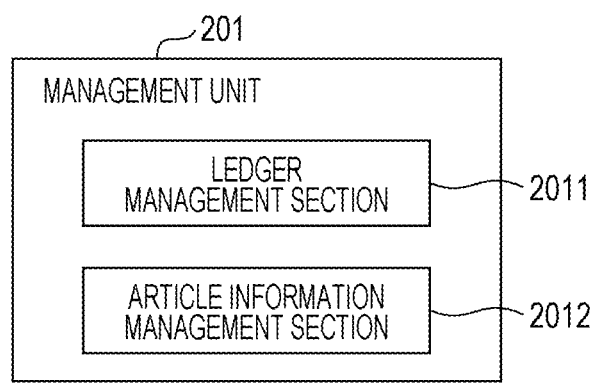
FIG. 3 is a block diagram illustrating an example of the detailed configuration of a management unit illustrated in FIG. 2.
Figure 4:
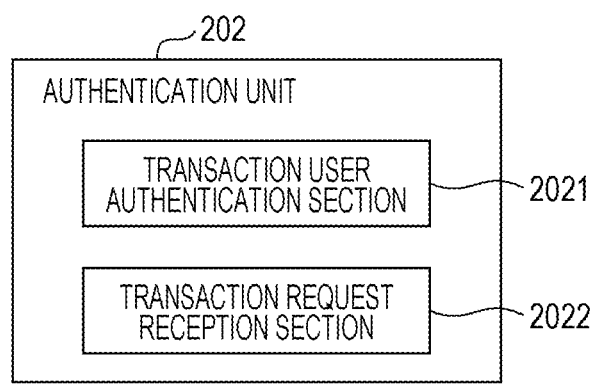
FIG. 4 is a block diagram illustrating an example of the detailed configuration of an authentication unit illustrated in FIG. 2.

FIG. 2 is a block diagram illustrating an example of the configuration of the server apparatus 2 illustrated in FIG. 1. FIG. 3 is a block diagram illustrating an example of the detailed configuration of a management unit 201 illustrated in FIG. 2. FIG. 4 is a block diagram illustrating the detailed configuration of an authentication unit 202 illustrated in FIG. 2.

The server apparatus 2 is achieved by a computer or the like including a memory. As illustrated in FIG. 2, the server apparatus 2 includes the management unit 201, the authentication unit 202, and a communication unit 203 and is connected to the storage device 21. The server apparatus 2 may be connected to the storage device 21 through the network 5 and include the storage device 21 therein. The storage device 21 stores an electronically recordable ledger 211.
Management Unit 201

The management unit 201 manages the ledger 211 stored in the storage device 21. The management unit 201 has a traceability function of tracing a history or a location of the article 4 to be traced. In the present embodiment, the management unit 201 includes a ledger management section 2011 and an article information management section 2012 as illustrated in FIG. 3. Alternatively, the management unit 201 need not include the article information management section 2012.
Ledger Management Section 2011

The ledger management section 2011 manages at least the right of ownership of the article 4, which is an actual object.

More specifically, the ledger management section 2011 manages the right of ownership of the article 4 by accumulating the movement of the right of ownership of the article 4 and manages opening and fastening of the lock 31 as a history. After the authentication unit 202 performs an authentication process, which will be described later, the ledger management section 2011 accumulates the movement of the right of ownership of the article 4 as a history by recording users to which the right of ownership of the article 4 has been granted. The ledger management section 2011 may uniquely identify the article 4 stored in the object storage 3 using an identifier for uniquely identifying the article 4 or an identifier for uniquely identifying the object storage 3.

In the present embodiment, the ledger management section 2011 manages the ledger 211 and accumulates the movement of the right of ownership of the article 4 as a history by recording, in the ledger 211, reference to the article 4 and the movement of the right of ownership of the article 4. If the ledger management section 2011 receives, from a transaction request reception section 2022, a transaction request for the article 4, such as a request to register or change the right of ownership of the article 4, for example, the ledger management section 2011 records the right of ownership of the article 4 or the movement of the right of ownership of the article 4 in the ledger 211. The ledger management section 2011 may also record article identification information, which is used to identify the article 4, in the ledger 211. As described above, the article identification information regarding the article 4 may be the identifier for uniquely identifying the article 4 or the identifier for uniquely identifying the object storage 3.

The ledger management section 2011 accumulates opening and fastening of the lock 31 as a history by recording opening and fastening of the lock 31 in the ledger 211. If the ledger management section 2011 receives a notification from a lock management unit 302 of the object storage 3, which will be described later, for example, the ledger management section 2011 manages an opening and fastening history of the object storage 3 by accumulating opening or fastening of the lock 31 as a history. The opening and fastening history may be an opening history or a fastening history, instead. The ledger management section 2011 may uniquely identify the lock 31 using an identifier for uniquely identifying the lock 31 or the identifier for uniquely identifying the object storage 3 provided with the lock 31.

The ledger management section 2011 thus manages the right of ownership of the article 4 and the opening and fastening history of the lock 31 by keeping records in the ledger 211. A method used by the ledger management section 2011 to manage the opening and fastening history of the lock 31 is not limited to the above-described method in which the ledger 211 is used. The ledger management section 2011 may manage the opening and fastening history of the lock 31 by recording opening and fastening of the lock 31 in another ledger stored in the storage device 21 or an area of the storage device 21, instead.

Although the ledger management section 2011 identifies the article 4 on the basis of the identifier of the object storage 3 by recording the identifier of the object storage 3 storing the article 4 in the ledger 211 in the present embodiment, the method used by the ledger management section 2011 is not limited to this. For example, the ledger management section 2011 may identify the article 4 and the object storage 3 storing the article 4 by recording the identifier of the article 4 and the identifier of the object storage 3 storing the article 4 in the ledger 211 and managing an association between the article 4 and the object storage 3 storing the article 4. The ledger management section 2011 may also record the dealing of the object storage 3 or transactions for the object storage 3 in the ledger 211.

Article Information Management Section 2012

The article information management section 2012 manages article information, which is information regarding the article 4. More specifically, the article information management section 2012 manages the article information regarding the article 4 by recording information regarding the article 4 in an area prepared in the storage device 21 or in the ledger 211. Here, the article information regarding the article 4 is, for example, information indicating that the article 4 is a melon from Hokkaido that weighs 1 kg and that is graded as excellent. That is, the article information regarding the article 4 is information including attributes of the article 4 such as a place of production and quality. The article information management section 2012 may manage the article identification information for identifying the article 4 as part of the article information regarding the article 4. As described above, the article identification information for identifying the article 4 may be the identifier for uniquely identifying the article 4 or the identifier for uniquely identifying the object storage 3.

Authentication Unit 202

The authentication unit 202 performs at least the authentication process by which whether user who has issued a transaction request for the article 4 is an authenticated transaction user is determined. In the present embodiment, as illustrated in FIG. 4, the authentication unit 202 includes a transaction user authentication section 2021 and the transaction request reception section 2022. The authentication process is performed when a user has issued a registration request, a change request, an opening request, a fastening request, or the like to the server apparatus 2 through a terminal used or carried thereby. The authentication process may be performed, for example, using a public key infrastructure (PKI) employing a public key and a private key. The terminal may be a personal computer or a mobile terminal such as a tablet or a smartphone. A transaction user will also be simply referred to as a "user" hereinafter.

Transaction User Authentication Section 2021

The transaction user authentication section 2021 performs the authentication process for identifying an authenticated transaction user, that is, determines whether a user who has issued a transaction request for the article 4 is an authenticated transaction user. Here, the transaction user, that is, the user, may be a producer of the article 4, a distributor of the article 4, an agent such as a retailer of the article 4, or a purchaser of the article 4. Transactions for the article 4 include preparation for shipment of the article 4, shipment of the article 4, wholesaling of the article 4, selling of the article 4, and purchase of the article 4 and accompany registration or movement of the right of ownership of the article 4 stored in the object storage 3. Transactions for the article 4 may also include opening and fastening of the lock 31 provided for the object storage 3.

More specifically, if a user issues a request for the article 4 to the server apparatus 2 from the terminal such as a smartphone, the transaction user authentication section 2021 determines whether the user is an authenticated transaction user. In an example, the transaction user authentication section 2021 determines whether a user who has issued a change request to change the right of ownership of the article 4 is a user who has the right of ownership managed by the ledger management section 2011. The user who has the right of ownership is a user who has the right of ownership of the article 4 and who has the right of ownership of the article 4 uniquely identified using the identifier of the object storage 3 storing the article 4. After determining that the user is an authenticated transaction user, the transaction user authentication section 2021 issues a transaction request for the article 4 to the transaction request reception section 2022.

Transaction Request Reception Section 2022

If the transaction request reception section 2022 receives a transaction request for the article 4 from the transaction user authentication section 2021, the transaction request reception section 2022 performs a reception process by the transaction request for the article 4 is received. In an example, the transaction request reception section 2022 performs a reception process by which a change request to change the right of ownership of the article 4 is received. The transaction request reception section 2022 transmits the received transaction request for the article 4 to the ledger management section 2011 and a determination unit 301 of the object storage 3, which will be described later.

Communication Unit 203

The communication unit 203 is achieved by a processor, a communication interface, and the like and has a function of communicating with the object storage 3 storing the article 4 to be traced. In the present embodiment, communication unit 203 communicates with a communication unit 303 of the object storage 3, which will be described later, through wired communication such as a wired local area network (LAN) or wireless communication. Technologies for achieving wireless communication include Bluetooth (registered trademark) Low Energy (BLE), low-power wide-area (LPWA), the fourth generation (4G) of mobile communication systems, and the fifth generation (5G) of mobile communication systems.

Object Storage 3

Figure 5:
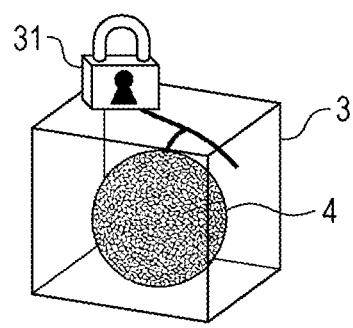
FIG. 5 is a diagram conceptually illustrating the appearance of an object storage illustrated in FIG. 1.
Figure 6:
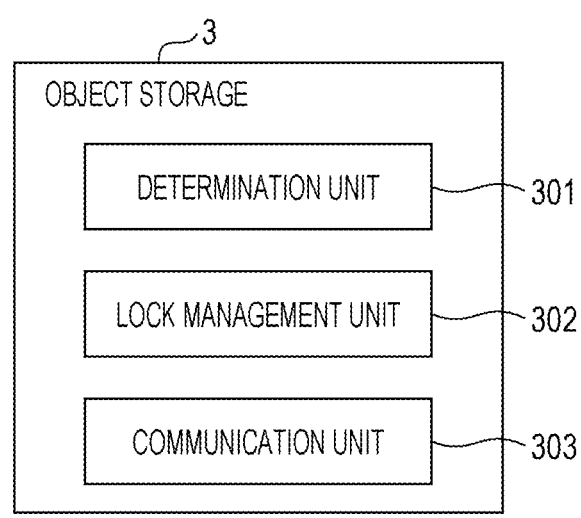
FIG. 6 is a block diagram illustrating an example of the detailed configuration of the object storage illustrated in FIG. 5.

FIG. 5 is a diagram conceptually illustrating the appearance of the object storage 3 illustrated in FIG. 1. FIG. 6 is a block diagram illustrating an example of the detailed configuration of the object storage 3 illustrated in FIG. 5.

As illustrated in FIG. 5, the object storage 3 is a case or a box, for example, and provided with the lock 31 opened and fastened through an electronic process. The object storage 3 is capable of physically storing the article 4, which is an actual object such as a product. The object storage 3 may be a transparent case or an opaque latticed or barred case so that the article 4 can be seen with the lock 31 fastened. It is only required that the object storage 3 be made of a material with which the article 4 can be removed and stored using the lock 31, such as vinyl, corrugated cardboard, plastic, or cloth. It is needless to say that the object storage 3 may be made of iron or aluminum. Any material may be used insofar as the lock 31 can be provided and the article 4 can be removed and stored using the lock 31.

In the present embodiment, the object storage 3 also includes the determination unit 301, the lock management unit 302, and the communication unit 303 as illustrated in FIG. 6. Alternatively, the object storage 3 need not include the determination unit 301, and the server apparatus 2 may include the determination unit 301, instead.

Determination Unit 301

If the determination unit 301 receives an opening request to open the lock 31, the determination unit 301 determines whether a user who has issued the opening request and a user who has the right of ownership managed by the ledger management section 2011 match.

It is assumed in the present embodiment that the determination unit 301 receives, from the transaction request reception section 2022, an opening request to open the lock 31 provided for the object storage 3 as a transaction request for the article 4. In this case, the determination unit 301 determines whether the user who has issued the opening request has the right of ownership of the article 4 by communicating with the ledger management section 2011. If determining that the user who has issued the opening request has the right of ownership of the article 4, the determination unit 301 issues the request to the lock management unit 302 along with the result of the determination. The result of the determination may be information indicating that the user who has issued the opening request has a right to open the lock 31 or may be information indicating that the user who has issued the opening request is an authenticated transaction user who has a right to open the lock 31.

The same holds for a case where the determination unit 301 has received a fastening request to fasten the lock 31, and description of this case is omitted.

Lock Management Unit 302

The lock management unit 302 can open and fasten the lock 31. The lock management unit 302 notifies the ledger management section 2011 that the lock management unit 302 has opened or fastened the lock 31. If the determination unit 301 determines that a user who has issued an opening request and a user who has the right of ownership managed by the ledger management section 2011 match, for example, the lock management unit 302 opens the lock 31 to allow the article 4 to be removed from the object storage 3. In addition, that is, at the same time, the lock management unit 302 communicates with the ledger management section 2011 to notify the ledger management section 2011 that the lock management unit 302 has opened the lock 31.

In the present embodiment, if the determination unit 301 determines that the user who has issued the opening request has the right of ownership of the article 4, the lock management unit 302 determines that the user has a right to open the lock 31 and opens the lock 31. At the same time, the lock management unit 302 notifies, through the communication unit 303, the ledger management section 2011 that the lock management unit 302 has opened the lock 31 and causes the ledger management section 2011 to record the opening of the lock 31 in the ledger 211 as a history.

Communication Unit 303

The communication unit 303 is achieved by a processor, a communication interface, and the like and has a function of communicating with the server apparatus 2. In the present embodiment, the communication unit 303 communicates with the communication unit 203 of the server apparatus 2, for example, through wireless communication. The technologies for achieving wireless communication are as described above.

Operation of Supply Chain System 1

The operation of the supply chain system 1 configured as above will be described hereinafter.

Figure 7:
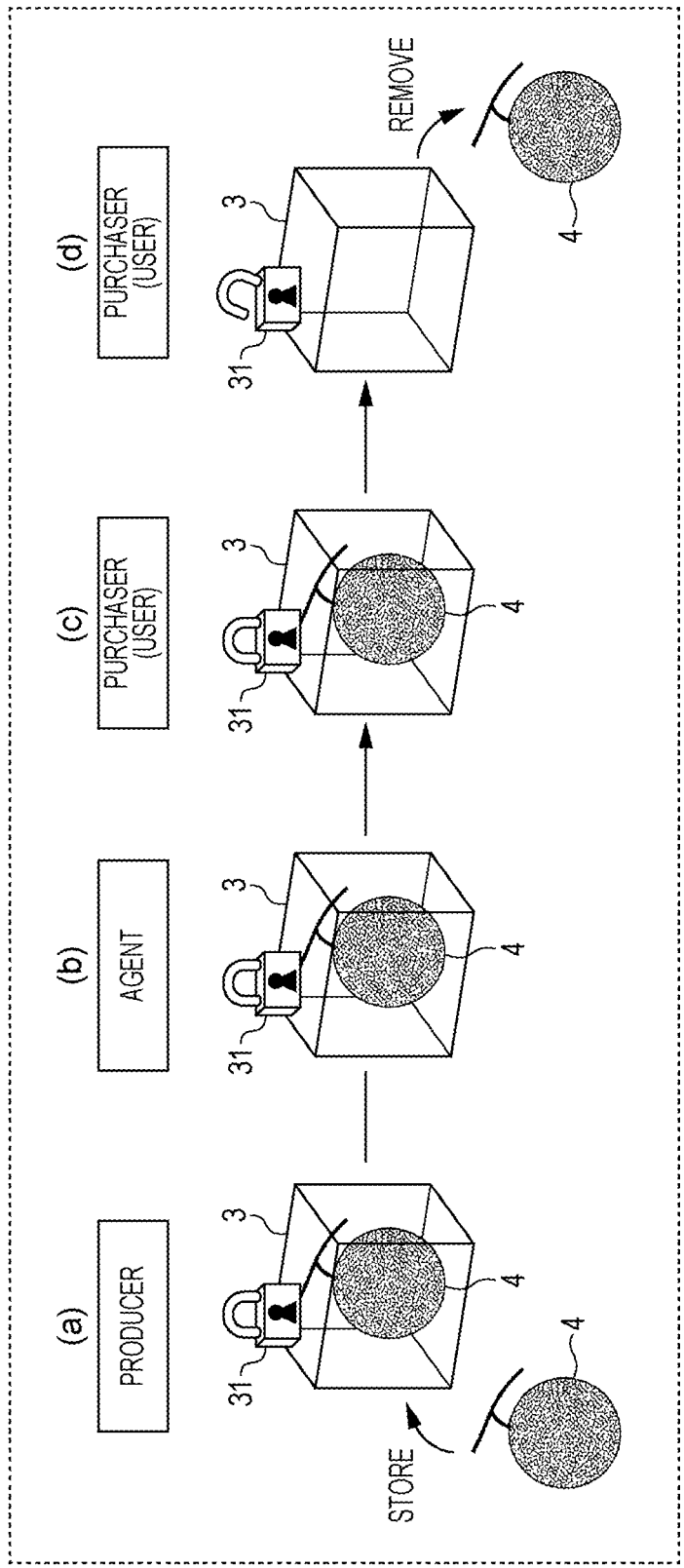
FIG. 7 is a diagram conceptually illustrating the operation of the supply chain system according to the embodiment.

FIG. 7 is a diagram conceptually illustrating the operation of the supply chain system 1 according to the present embodiment. FIG. 8 is a diagram illustrating transaction users, the right of ownership, and opening histories, and the like with respect to the article 4 in a situation illustrated in FIG. 7. In FIGS. 7 and 8, the article 4 is assumed to be a melon. In FIG. 8, a case is illustrated in which the identifier of the object storage 3 is recorded in the ledger 211 as the article identification information, which is used to identify the article 4.

First, a producer of the melon harvests the melon and prepares for shipment of the melon. More specifically, as illustrated in FIG. 7(a), the producer of the melon stores the article 4, which is the melon, in the object storage 3. The producer then conducts, using the supply chain system 1, a transaction for, as indicated by situation 1 illustrated in FIG. 8 corresponding to FIG. 7(a), registering the producer as a transaction user and a person who has the right of ownership, the melon as article information regarding the article 4, and the identifier of the object storage 3 as the article identification information. The producer then conducts, using the supply chain system 1, a transaction for fastening the lock 31 provided for the object storage 3 storing the article 4. Since the producer of the melon has stored the article 4 in the object storage 3 for shipment and has not opened the lock 31 in situation 1 illustrated in FIG. 8, there is no opening history.

Next, the producer of the melon ships the melon. More specifically, as illustrated in FIG. 7(b), the producer of the melon conducts a transaction for shipping the article 4 stored in the object storage 3 to an agent such as a broker or a retailer. The producer then conducts, using the supply chain system 1, a transaction for, as indicated by situation 2 illustrated in FIG. 8 corresponding to FIG. 7(b), changing the transaction user and the person who has the right of ownership to the agent. Since the producer of the melon and the agent have only distributed the article 4 stored in the object storage 3 and have not opened the lock 31 in situation 2 illustrated in FIG. 8, there is no opening history.

Next, the agent sells the melon to a user, that is, a purchaser. More specifically, as illustrated in FIG. 7(c), the purchaser conducts a transaction for purchasing the article 4 stored in the object storage 3 from the agent. The agent then conducts, using the supply chain system 1, a transaction for, as indicated by situation 3 illustrated in FIG. 8 corresponding to FIG. 7(c), changing the transaction user and the person who has the right of ownership to the purchaser. The purchaser can check the opening history using the supply chain system 1 before and after purchasing the article 4 stored in the object storage 3. As a result, the purchaser can understand that no unlawful act has been performed on the article 4 shipped by the producer, and safely purchase or consume the article 4.

Next, the purchaser removes the article 4, which is the melon, from the object storage 3 and consumes the article 4. More specifically, the purchaser conducts, using the supply chain system 1, a transaction for, as indicated by situation 4 illustrated in FIG. 8 corresponding to FIG. 7(d), opening the lock 31 provided for the object storage 3 storing the article 4. The purchaser then removes the article 4, which is the melon, from the object storage 3 and consumes the article 4. Since the purchaser has opened the lock 31 provided for the object storage 3 in situation 4 illustrated in FIG. 8, an opening history is recorded in the ledger 211.

FIG. 9 is a flowchart illustrating an example of a characteristic operation performed by the supply chain system 1 according to the present embodiment. FIG. 9 illustrates a process for opening the lock 31 using the supply chain system 1.

First, a computer of the supply chain system 1 determines whether there has been an opening request to open the lock 31 provided for the object storage 3 (S11).

If there has been an opening request to open the lock 31 in step S11 (YES in S11), the computer of the supply chain system 1 determines whether a user who has issued the request and a transaction user who has the right of ownership match (S12). As illustrated in FIG. 7(c), for example, the user who is a purchaser issues, to the supply chain system 1, the opening request provided for the object storage 3 using a terminal or the like. In this case, the computer of the supply chain system 1 determines that there has been an opening request, and then determines whether the user who is the purchaser and the transaction user who has the right of ownership match.

If the user who has issued the opening request and the transaction user who has the right of ownership match in step S12 (YES in S12), the supply chain system 1 opens the lock 31 provided for the object storage 3. The supply chain system 1 then records an opening history of the lock 31 in the ledger 211 (S14).

In the present embodiment, the lock management unit 302 included in the object storage 3 receives a result indicating that the user who has issued the opening request and the transaction user who has the right of ownership match. The lock management unit 302 then opens the lock 31 provided for the object storage 3 and notifies the server apparatus 2 of the opening. The server apparatus 2 records an opening history of the lock 31 in the ledger 211.

If there has been no opening request in step 311 (NO in S11), the computer of the supply chain system 1 returns to step S11 and repeats the operation. Similarly, if the user who has issued the opening request and the transaction user who has the right of ownership do not match in step S12 (NO in S12), the computer of the supply chain system 1 returns to step S11 and repeats the operation.

Next, the detailed operation of the supply chain system 1 according to the present embodiment will be described.

Figure 10A:
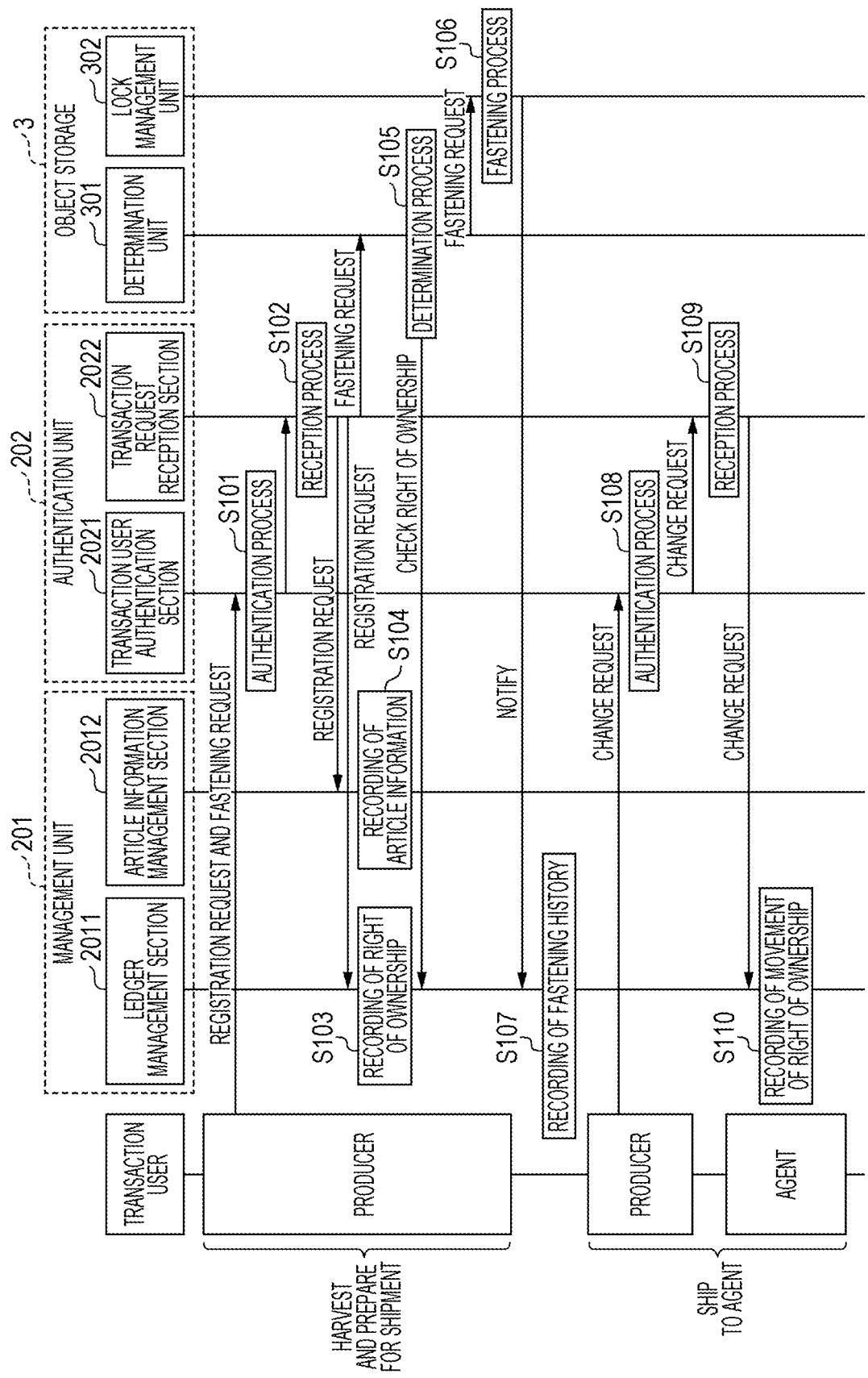
FIG. 10A is a sequence diagram illustrating an example of the operation of the supply chain system according to the embodiment.
Figure 10B:
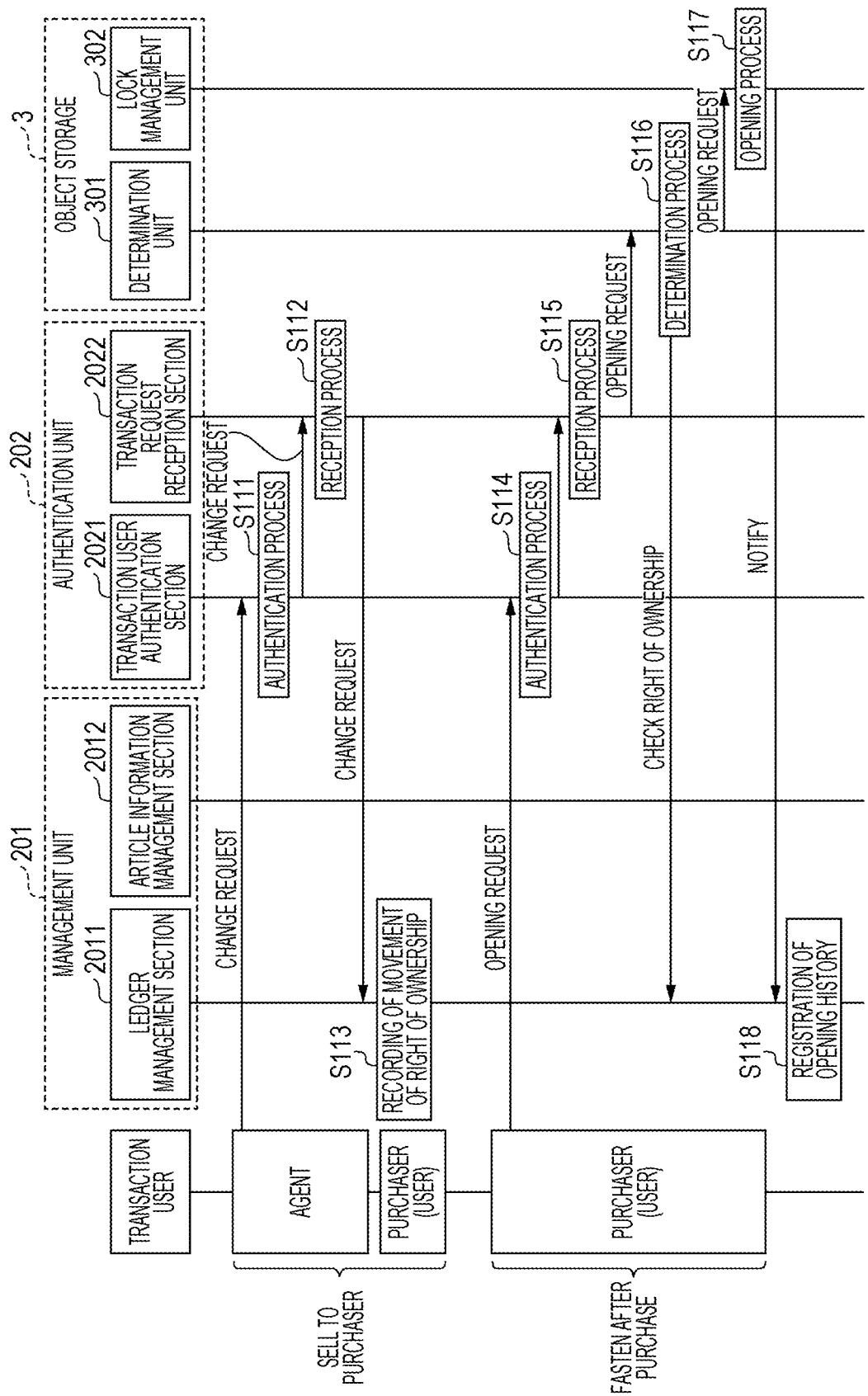
FIG. 10B is a sequence diagram illustrating the example of the operation of the supply chain system according to the embodiment.

FIGS. 10A and 10B are sequence diagrams illustrating an example of the operation of the supply chain system 1 according to the present embodiment. FIG. 10A illustrates situation 1, where the producer harvests the article 4 and prepares for shipment, and situation 2, where the producer ships the article 4 to the agent. FIG. 10B illustrates situation 3, where the agent sells the article 4 to the purchaser, and situation 4, where the purchaser purchases the article 4 and opens the lock 31 provided for the object storage 3 storing the article 4.

First, situation 1 will be described.

The producer harvests the article 4 and stores the article 4 in the object storage 3. The producer then logs in the supply chain system 1 using a terminal or the like and issues a registration request to register the producer as a transaction user and a person who has the right of ownership, the melon as article information regarding the article 4, and the identifier of the object storage 3 as the article identification information regarding the article 4 and a fastening request to fasten the lock 31 provided for the object storage 3.

Thereafter, first, the transaction user authentication section 2021 performs, in the supply chain system 1, an authentication process by which whether the producer is an authenticated transaction user is determined (S101). If the transaction user authentication section 2021 determines in step S101 that the producer is an authenticated transaction user, the transaction request reception section 2022 performs a reception process by which the registration request is received (S102). Next, the transaction request reception section 2022 transmits the registration request to the ledger management section 2011 and the article information management section 2012 and the fastening request to the determination unit 301.

Next, upon receiving the registration request, the ledger management section 2011 performs recording of the right of ownership, by which information indicating that the producer has the right of ownership of the article 4 is recorded in the ledger 211 (S103). Upon receiving the registration request, the article information management section 2012 performs registration of article information, by which information indicating that the article 4 is a melon and information indicating that the article identification information regarding the article 4 is the identification of the object storage 3 are recorded in the ledger 211 (S104). Steps S103 and S104 may be performed in any order. Although the article 4 is identified using the identifier of the object storage 3 in the following description, the identifier used is not limited to this. The article 4 may be identified using the identifier of the article 4, instead. In this case, information indicating the identifier of the article 4 is recorded as the article identification information regarding the article 4.

Next, upon receiving the fastening request, the determination unit 301 performs a determination process, in which the determination unit 301 communicates with the ledger management section 2011 and determines whether the producer who has issued the fastening request has the right of ownership of the article 4 (S105). If determining in step S105 that the producer who has issued the fastening request has the right of ownership of the article 4, the determination unit 301 transmits the fastening request to the lock management unit 302 along with the result of the determination.

Next, upon receiving the fastening request and the result of the determination, the lock management unit 302 determines that the producer has a right to fasten the lock 31, and performs a fastening process, by which the lock 31 is fastened (S106). At the same time, the lock management unit 302 notifies, through the communication unit 303, the ledger management section 2011 that the lock 31 has been fastened. That is, the ledger management section 2011 performs recording of a fastening history, by which the fastening of the lock 31 is recorded in the ledger 211 as a history (S107).

Next, situation 2 will be described.

After completing the preparation for shipment, the producer ships the object storage 3 storing the article 4 to the agent. At this time, the producer logs in the supply chain system 1 using a terminal or the like and issues a change request to change the transaction user and the person who has the right of ownership from the producer to the agent.

Thereafter, first, the transaction user authentication section 2021 performs, in the supply chain system 1, an authentication process by which whether the producer is an authenticated transaction user is determined (S108). If the transaction user authentication section 2021 determines in step S108 that the producer is an authenticated transaction user, the transaction request reception section 2022 performs a reception process by which the change request is received (S109). Next, the transaction request reception section 2022 transmits the change request to the ledger management section 2011.

Next, upon receiving the change request, the ledger management section 2011 performs recording of the movement of the right of ownership, by which information indicating that the agent has the right of ownership of the article 4 is recorded in the ledger 211 (S110).

Next, situation 3 will be described.

The agent sells the object storage 3 storing the article 4 to a user who is a purchaser. At this time, the agent logs in the supply chain system 1 using a terminal or the like and issues a change request to change the transaction user and the person who has the right of ownership from the agent to the user who is the purchaser.

Thereafter, first, the transaction user authentication section 2021 performs, in the supply chain system 1, an authentication process by which whether the agent is an authenticated transaction user is determined (S111). If the transaction user authentication section 2021 determines in step S111 that the agent is an authenticated transaction user, the transaction request reception section 2022 performs a reception process by which the change request is received (S112). Next, the transaction request reception section 2022 transmits the change request to the ledger management section 2011.

Next, upon receiving the change request, the ledger management section 2011 performs recording of the movement of the right of ownership, by which information indicating that the purchaser has the right of ownership of the article 4 is recorded in the ledger 211 (S113).

Lastly, a sequence in situation 4 will be described.

The purchaser removes the article 4, which is the melon, from the object storage 3 and consumes the article 4. At this time, the purchaser logs in the supply chain system 1 and issues an opening request to open the lock 31 provided for the object storage 3 storing the article 4. Thereafter, first, the transaction user authentication section 2021 performs, in the supply chain system 1, an authentication process by which whether the purchaser is an authenticated transaction user is determined (S114). If the transaction user authentication section 2021 determines in step S114 that the purchaser is an authenticated transaction user, the transaction request reception section 2022 performs a reception process by which the opening request is received (S115). Next, the transaction request reception section 2022 transmits the opening request to the determination unit 301.

Next, upon receiving the opening request, the determination unit 301 performs a determination process, in which the determination unit 301 communicates with the ledger management section 2011 and determines whether the purchaser who has issued the opening request has the right of ownership of the article 4 (S116). If determining in step S116 that the purchaser who has issued the opening request has the right of ownership of the article 4, the determination unit 301 transmits the opening request to the lock management unit 302 along with the result of the determination.

Next, upon receiving the opening request and the result of the determination, the lock management unit 302 determines that the purchaser has a right to open the lock 31, and performs an opening process, by which the lock 31 is opened (S117). At the same time, the lock management unit 302 notifies, through the communication unit 303, the ledger management section 2011 that the lock 31 has been opened. The ledger management section 2011 performs recording of an opening history, by which the opening of the lock 31 is recorded in the ledger 211 as a history (S118).

Advantageous Effects

As described above, since the article 4 stored in the object storage 3 physically locked by the lock 31 is distributed in the supply chain system 1 according to the present embodiment, it can be seen that the article 4 stored in the object storage 3 has not been tampered with when the lock 31 provided for the object storage 3 has not been opened. That is, whether an unlawful act has been performed on the article 4 can be determined. With the supply chain system 1 according to the present embodiment, therefore, unlawful acts performed on the article 4, such as false labeling of a place of production, can be suppressed, and cost efficiency can be achieved because there is no need to dispose of articles whose places of production have been falsely labeled.

In addition, in the supply chain system 1 according to the present embodiment, opening and fastening of the lock 31, which is opened and closed through an electronic process, are accumulated as histories. As a result, whether the lock 31 of the object storage 3 storing the article 4 has been opened during distribution can be determined. When the lock 31 has not been opened at all until a user who consumes or uses the article 4 opens the lock 31 and removes the article 4, therefore, it can be seen that the article 4 stored in the object storage 3 has not been tampered with. Consequently, whether an unlawful act has been performed on the article 4 can be determined more accurately.

As described above, the object storage 3 included in the supply chain system 1 according to the present embodiment may be a transparent case or an opaque latticed or barred case. As a result, the article 4 can be checked with the lock 31 provided for the object storage 3 fastened, and whether an unlawful act has been performed on the article 4, such as whether the article 4 stored in the object storage 3 has been tampered with, can be determined more easily.

First Modification

Although only one ledger 211 is used in the above embodiment for the convenience of description, the number of ledgers 211 is not limited to this. Distributed ledgers including a plurality of ledgers 211 of the same content may be used, or distributed ledgers including a plurality of ledgers 211 of the same content constructed on a blockchain platform may be used, instead. This case will be described hereinafter as a first modification. Differences from the above embodiment will be mainly described.

Server Apparatuses

Figure 11:
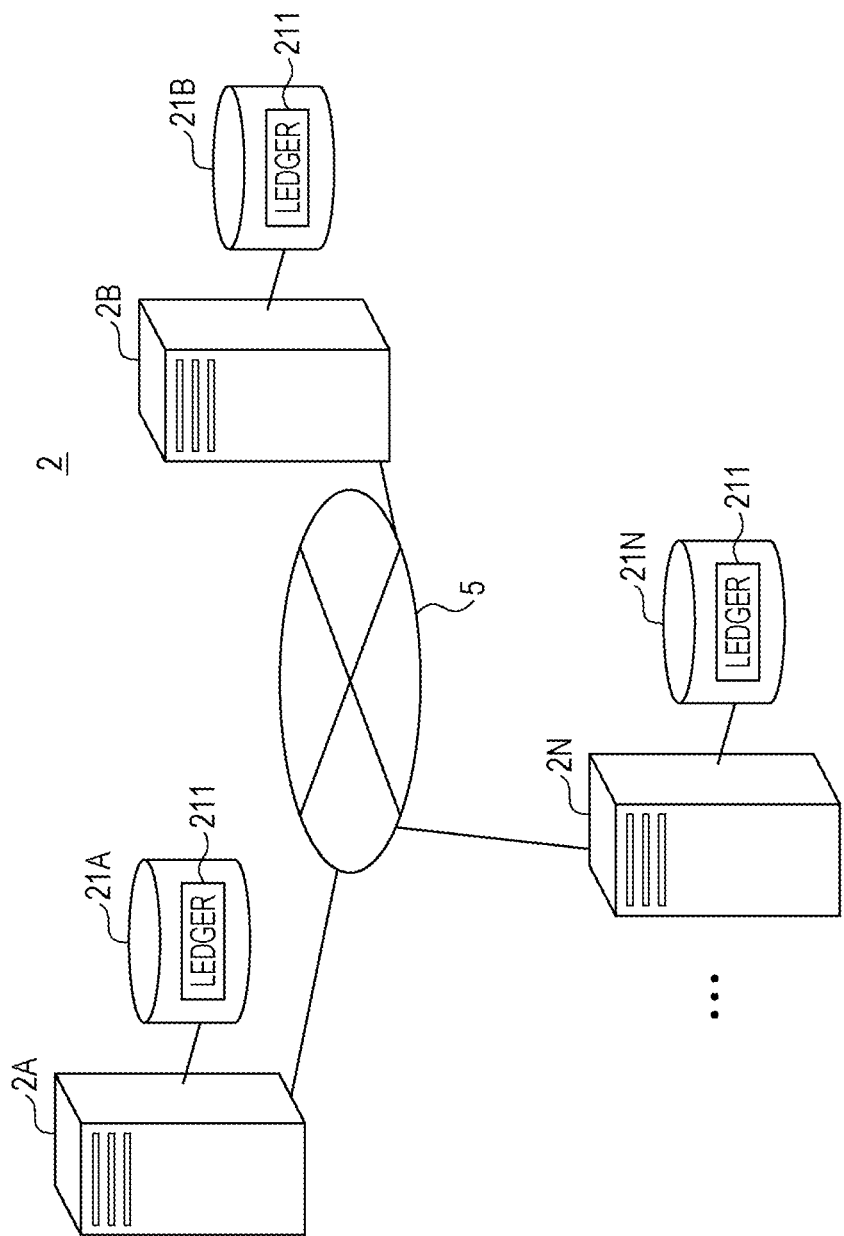
FIG. 11 is a diagram illustrating an example of the configuration of a server apparatus according to a first modification.

FIG. 11 is a diagram illustrating an example of the configuration of server apparatuses 2 according to the first modification. The same components are given the same reference numerals, and detailed description thereof is omitted.

The server apparatuses 2 illustrated in FIG. 11 include a plurality of server apparatuses 2A, 2B, ... , and 2N. The plurality of server apparatuses 2A, 2B, ... , and 2N are connected to one another through a network 5 and connected to storage devices 21A, 21B, ... , and 21N. The storage devices 21A, 21B, ... , and 21N each include a ledger 211 of the same content.

It is assumed in the present modification that a management unit 201 of one of the plurality of server apparatuses 2A, 2B, ... , and 2N has performed recording in the ledger 211 stored in the storage device connected to the server apparatus. In this case, the management units 201 of the other apparatuses record, in the ledgers 211 stored in the storage devices 21A, 21B, ... , and 21N, the same content as that recorded in the ledger 211 stored in the foregoing storage device. The ledgers 211 may be constructed on a blockchain platform.

The configuration of the plurality of server apparatuses 2A, 2B, ... , and 2N is the same as that according to the above embodiment described with reference to FIGS. 2 to 4, and description thereof is omitted. The plurality of server apparatuses 2A, 2B, ... , and 2N may be achieved by personal computers or cloud computers.

The appearance and configuration of the object storage 3 are as described in the above embodiment, and description thereof is omitted.

Operation of Supply Chain System 1 According to First Modification

FIG. 12 is a diagram conceptually illustrating the operation of a supply chain system 1 according to the first modification. The same components as those illustrated in FIG. 7 are given the same reference numerals, and detailed description thereof is omitted.

In FIG. 12(a), the producer illustrated in FIG. 7(a) is represented as a producer A. The agent illustrated in FIG. 7(b) is represented as a broker B and a retailer C in FIGS. 12(b) and 12(b), respectively. The purchaser illustrated in FIG. 7(c) is represented as a purchaser D in FIG. 12(d). FIG. 12 is the same as FIG. 7 except that the terms used are different and there are a plurality of agents, and description thereof is omitted.

Figure 13A:
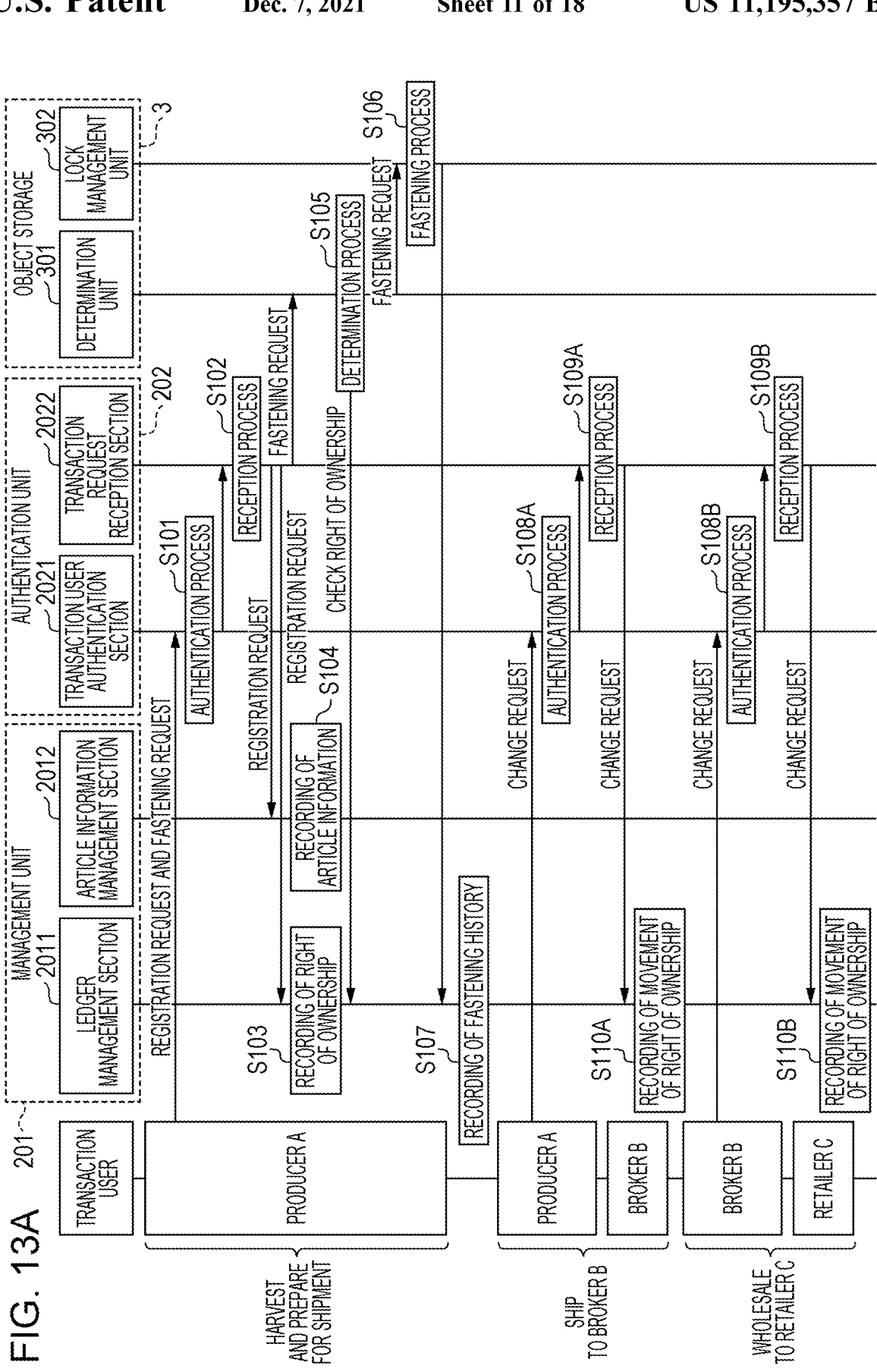
FIG. 13A is a sequence diagram illustrating an example of the operation of the supply chain system according to the first modification.
Figure 13B:
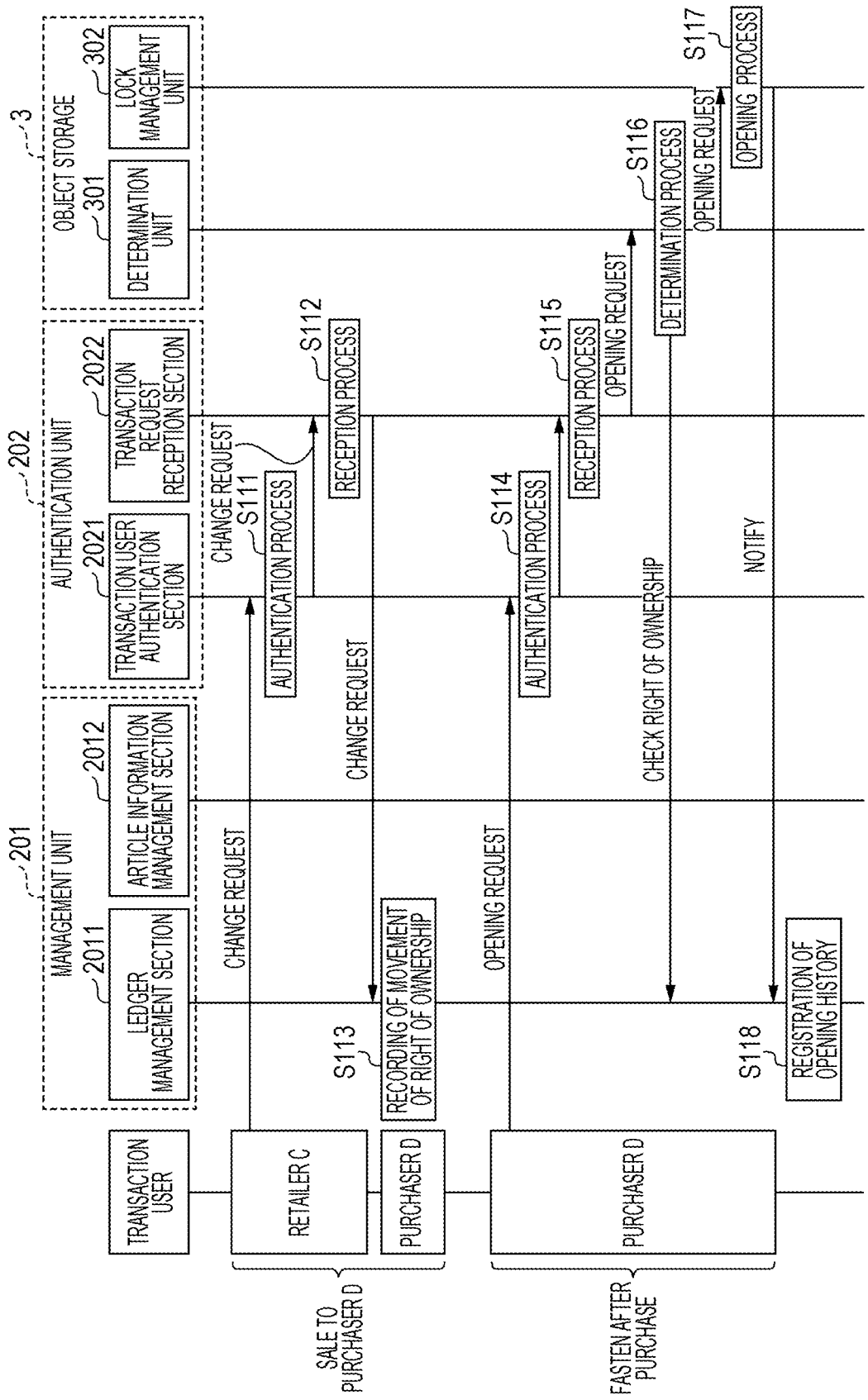
FIG. 13B is a sequence diagram illustrating the example of the operation of the supply chain system according to the first modification.

FIGS. 13A and 13B are sequence diagrams illustrating an example of the operation of the supply chain system 1 according to the first modification. The same components as those illustrated in FIGS. 10A and 10B are given the same reference numerals, and detailed description thereof is omitted.

FIG. 13A illustrates situation 11, where the producer A harvests the article 4 and prepares for shipment, situation 12, where the producer A ships the article 4 to the broker B, and situation 13, where the broker B wholesales the article 4 to the retailer C. FIG. 13B illustrates situation 14, where the retailer C sales the article 4 to the purchaser D who is the user, and situation 15, where the purchaser D opens the lock 31 of the object storage 3 storing the article 4 after purchasing the article 4. That is, the agent illustrated in FIGS. 10A and 10B corresponds to the broker B and the retailer C illustrated in FIG. 13A, and is described as the retailer C in FIG. 13B. In addition, steps S108 to S110 are described as steps S108A to S110A and steps S108B to S110B for the broker B and the retailer C. Aside from these, FIGS. 13A and 13B are the same as FIGS. 10A and 10B are the same, and description thereof is omitted.

Data in Ledger 211

Now, an example of a data structure when the ledger 211 is constructed on a blockchain platform will be described.

FIGS. 14A to 14D are diagrams conceptually illustrating an example of the structure of data recorded in a ledger 211 according to the first modification. A melon F is an example of the article 4.

Figure 14A:
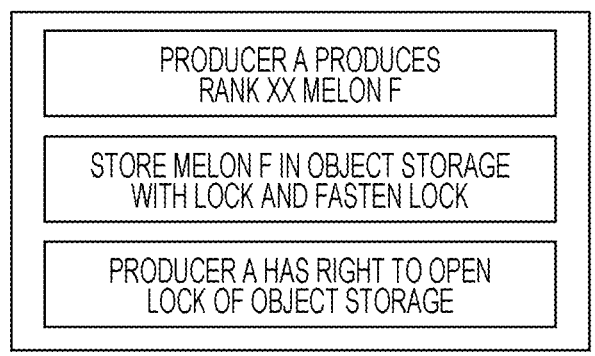
FIG. 14A is a diagram conceptually illustrating an example of the structure of data recorded in a ledger according to the first modification.

FIG. 14A illustrates an example of the structure of data recorded in the ledger 211 in the situation illustrated in FIG. 12(a), that is, after the preparation for shipment illustrated in FIG. 13A. More specifically, FIG. 14A illustrates a case in which data indicating that the producer A has produced a rank XX melon F, stored the melon F in the object storage 3 with the lock 31, and fastened the lock 31 and has a right to open the lock 31 of the object storage 3 is recorded and accumulated chronologically in this order.

Figure 14B:
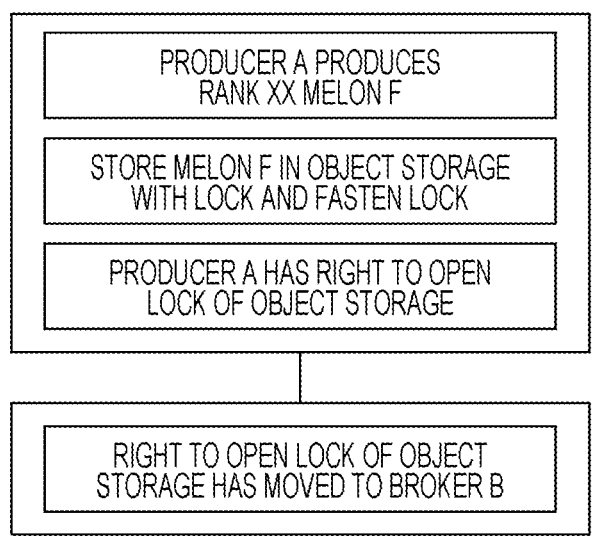
FIG. 14B is a diagram conceptually illustrating an example of the structure of data recorded in the ledger according to the first modification.

FIG. 14B illustrates an example of the structure of data recorded in the ledger 211 in the situation illustrated in FIG. 12(b), that is, after the shipment illustrated in FIG. 13A. More specifically, FIG. 14B illustrates a case in which data indicating that the right to open the lock 31 of the object storage 3 has moved to the broker B is recorded and accumulated after the data illustrated in FIG. 14A.

Figure 14C:
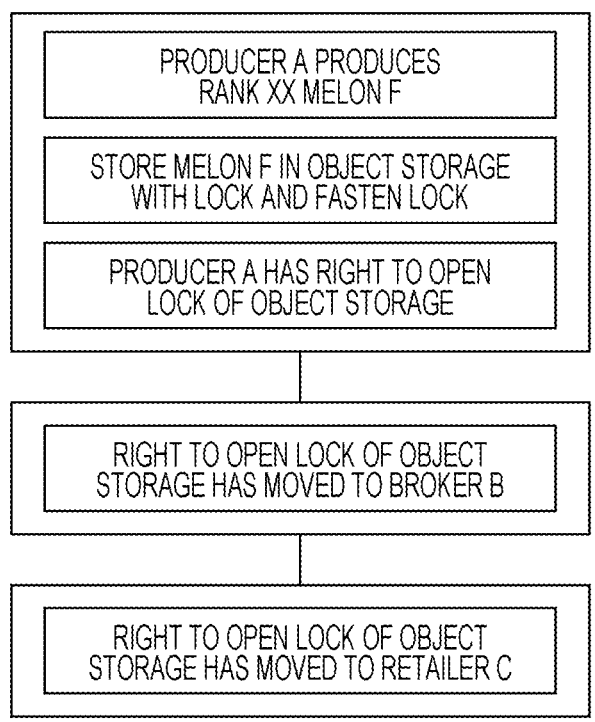
FIG. 14C is a diagram conceptually illustrating an example of the structure of data recorded in the ledger according to the first modification.

Similarly, FIG. 14C illustrates an example of the structure of data recorded in the ledger 211 in the situation illustrated in FIG. 12(c), that is, after the wholesaling to the retailer C illustrated in FIG. 13A. More specifically, FIG. 14C illustrates a case in which data indicating that the right to open the lock 31 of the object storage 3 has moved to the retailer C is recorded and accumulated after the data illustrated in FIG. 14B.

Figure 14D:
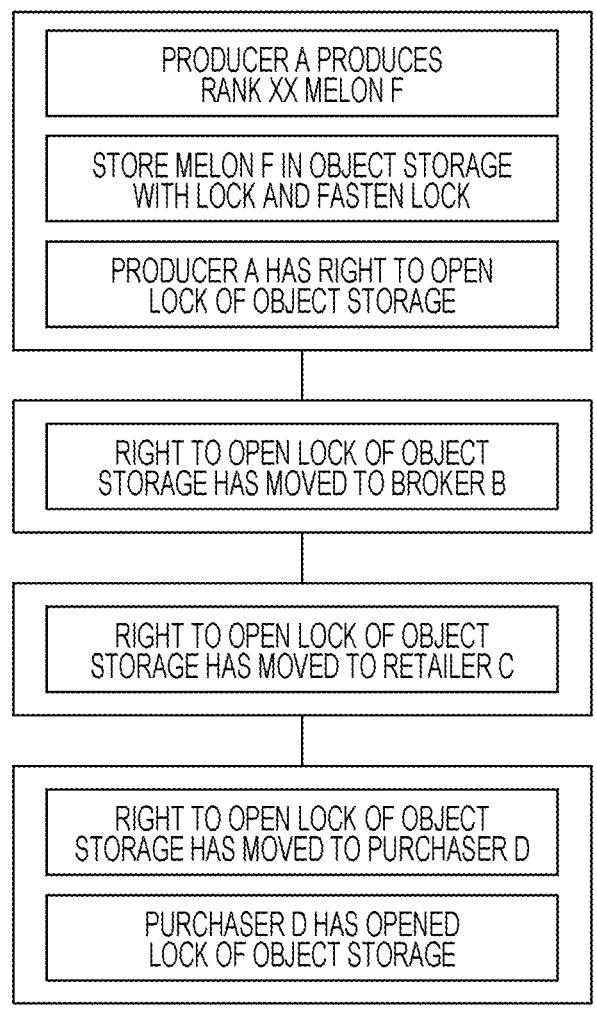
FIG. 14D is a diagram conceptually illustrating an example of the structure of data recorded in the ledger according to the first modification.

FIG. 14D illustrates an example of the structure of data recorded in the ledger 211 in the situation illustrated in FIG. 12D, that is, after the selling to the purchaser D and the opening of the lock 31 illustrated in FIG. 13B. More specifically, FIG. 14D illustrates a case in which data indicating that the right to open the lock 31 of the object storage 3 has moved to the purchaser D is recorded and accumulated after the data illustrated in FIG. 14B.

FIG. 15 is a diagram conceptually illustrating another example of the structure of data recorded in the ledger 211 according to the first modification. FIG. 15 illustrates data that chronologically indicates transaction users, the article 4 to be dealt with, that is, the article 4 to be traced, and transactions and that is recorded and accumulated in the ledger 211.

In FIG. 15, data indicating that the transaction user is the producer A, the article 4 is the melon F, and the transaction is registration of the object storage 3 is recorded in a first row. This corresponds to the data recorded in the ledger 211 in the situation illustrated in FIG. 12(a), that is, after the preparation for shipment illustrated in FIG. 13A.

In FIG. 15, data indicating that the transaction user is the producer A, the article 4 is the melon F, and the transaction is movement of the right of ownership to the broker B is recorded in a second row. This corresponds to the data recorded in the ledger 211 in the situation illustrated in FIG. 12(b), that is, after the shipment illustrated in FIG. 13A. In FIG. 15, data indicating that the transaction user is the broker B, the article 4 is the melon F, and the transaction is movement of the right of ownership to the retailer C is recorded in a third row. This corresponds to the data recorded in the ledger 211 in the situation illustrated in FIG. 12(c), that is, after the wholesaling to the retailer C illustrated in FIG. 13A.

In FIG. 15, data indicating that the transaction user is the retailer C, the article 4 is the melon F, and the transaction is movement of the right of ownership to the purchaser D is recorded in a fourth row. This corresponds to the data recorded in the ledger 211 in the situation illustrated in FIG. 12(d), that is, after the selling to the purchaser D illustrated in FIG. 13B.

In FIG. 15, data indicating that the transaction user is the purchaser D, the article 4 is the melon F, and the transaction is opening of the lock 31 of the object storage 3 is recorded in a fifth row. This corresponds to the data recorded in the ledger 211 in the situation illustrated in FIG. 12(d), that is, after the purchaser D illustrated in FIG. 13B opens the lock 31.

Advantageous Effects

As described above, with the supply chain system 1 according to the present modification, the ledger management section 2011 may manage the right of ownership of the article 4 by accumulating, as histories, the movement of the right of ownership of the article 4 in distributed ledgers including a plurality of ledgers 211 of the same content constructed on a blockchain platform, and manage opening and fastening of the lock 31 as histories. As a result, since the identical ledgers 211 are distributed in the supply chain system 1 according to the present modification, it becomes more difficult to alter the ledgers 211. As a result, the reliability of the content recorded in the ledger 211 improves, and whether an unlawful act has been performed on the article 4 can be determined more accurately.

Second Modification

Although the object storage 3 includes the determination unit 301 in the embodiment and the first modification, the location of the determination unit 301 is not limited to this. A server apparatus may include the determination unit 301, instead. This case will be described hereinafter as a second modification, and differences from the embodiment and the first modification will be mainly described.

Configuration of Supply Chain System 1A

Figure 16:
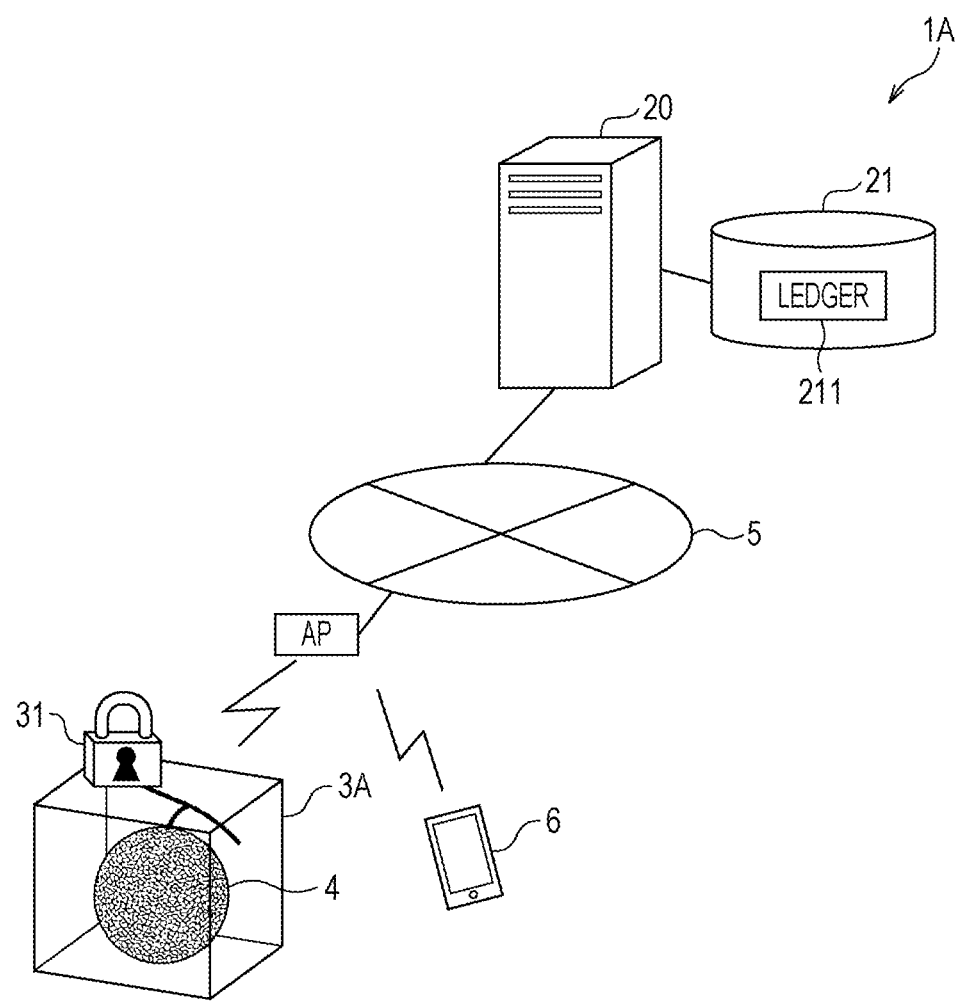
FIG. 16 is a diagram illustrating an example of the configuration of a supply chain system according to a second modification.

FIG. 16 is a diagram illustrating an example of the configuration of a supply chain system 1A according to the second modification. The same components as those illustrated in FIG. 1 and other drawings are given the same reference numerals, and detailed description thereof is omitted. As illustrated in FIG. 16, the supply chain system 1A includes a server apparatus 20 connected to the storage device 21 and an object storage 3A provided with the lock 31. The server apparatus 20 and the object storage 3A are connected to each other through the network 5.

The supply chain system 1A illustrated in FIG. 16 is different from the supply chain system 1 illustrated in FIG. 1 in terms of the configuration of the server apparatus 20 and the functional configuration of the object storage 3A. In addition, in the present modification, a user can open the lock 31 through near-field communication where a mobile terminal 6 comes into contact or becomes close to the lock 31 provided for the object storage 3A. Other elements are the same as those described above, and description thereof is omitted.

Mobile Terminal 6

The mobile terminal 6 includes a processor and a memory and is capable of wirelessly communicating with the server apparatus 20 and performing near-field communication with the lock 31 provided for the object storage 3A. The mobile terminal 6 is, for example, a tablet, a smartphone, or the like.

The mobile terminal 6 logs in the supply chain system 1A, that is, communicates with the server apparatus 20, through a user operation. More specifically, the mobile terminal 6 logs in the supply chain system 1A through a user operation and issues a registration request to register the right of ownership of the article 4 stored in the object storage 3A, a change request to change the right of ownership, a fastening request to fasten the lock 31 of the object storage 3A, or an opening request to open the lock 31 of the object storage 3A. In the present modification, the mobile terminal 6 obtains an identifier of the object storage 3A and issues an opening request to open the lock 31 of the object storage 3A when in contact with or close to the lock 31 through a user operation. In response to the opening request, the mobile terminal 6 obtains an electronic key capable of opening the lock 31 along with a result of a determination that the lock 31 may be opened. Alternatively, a terminal different from the mobile terminal 6 may issue the opening request, and the mobile terminal 6 may obtain, in response to the opening request, the opening request and the result of the determination. In any case, the mobile terminal 6 can open the lock 31 by transmitting a result of a determination and the like obtained when in contact with or close to the lock 31 through a user operation.

Server Apparatus 20

Figure 17:
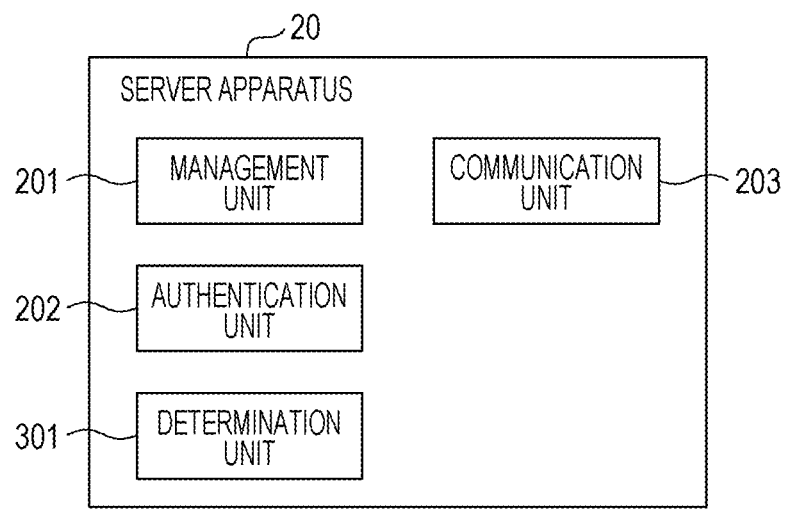
FIG. 17 is a block diagram illustrating an example of the configuration of a server apparatus illustrated in FIG. 16.

FIG. 17 is a block diagram illustrating an example of the configuration of the server apparatus 2A illustrated in FIG. 16. The same components as those illustrated in FIGS. 2 and 6 and other drawings are given the same reference numerals, and detailed description thereof is omitted.

The server apparatus 20 is different from the server apparatus 2 illustrated in FIG. 2 in that the server apparatus 20 further includes the determination unit 301.

In the present modification, the determination unit 301 receives an opening request to open the lock 31 from the mobile terminal 6 through the network 5. As described above, upon receiving the opening request to open the lock 31, the determination unit 301 determines whether a user who has issued the opening request and a user who has the right of ownership managed by the ledger management section 2011 match. If determining that the user who has issued the opening request has the right of ownership of the article 4, the determination unit 301 may transmit an electronic key capable of opening the lock 31 to the mobile terminal 6 along with the result of the determination.

Alternatively, as in the above embodiment, the determination unit 301 may transmit the opening request and the result of the determination to the lock management unit 302.

Object Storage 3A

Figure 18:
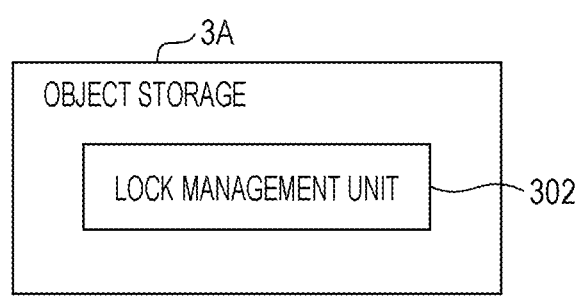
FIG. 18 is a block diagram illustrating an example of the detailed configuration of an object storage illustrated in FIG. 16.

FIG. 18 is a block diagram illustrating an example of the detailed configuration of the object storage 3A illustrated in FIG. 16. The same component as that illustrated in FIG. 6 and other drawings is given the same reference numeral, and detailed description thereof is omitted.

The object storage 3A is different from the object storage 3 illustrated in FIG. 6 in that the object storage 3A does not include the determination unit 301. The lock management unit 302 is different from that according to the embodiment in that the lock management unit 302 can perform near-field communication as wireless communication.

As described above, if the determination unit 301 determines that a user who has issued an opening request and a user who has the right of ownership managed by the ledger management section 2011 match, the lock management unit 302 may open the lock 31 to allow the article 4 to be removed from the object storage 3A. In the present modification, the lock management unit 302 performs near-field communication with the mobile terminal 6 when the mobile terminal 6 is in contact with or close to the lock 31. Upon receiving a result of the determination that the lock 31 may be opened and an electronic key capable of opening the lock 31 or the result of the determination and the opening request, the lock management unit 302 opens the lock 31 to allow the object storage 3A to be removed from the article 4.

As in the above embodiment, the lock management unit 302 opens the lock 31 and communicates with the ledger management section 2011 to notify the ledger management section 2011 that the lock 31 has been opened.

Advantageous Effects

As described above, with the supply chain system 1A according to the present modification, the object storage 3A storing the article 4 is physically locked and distributed. When the lock 31 has not been opened, therefore, it can be seen that the article 4 stored in the object storage 3A has not been tampered with. That is, whether an unlawful act has been performed on the article 4 can be determined. With the supply chain system 1A according to the present modification, therefore, unlawful acts performed on the article 4, such as false labeling of a place of production, can be suppressed, and cost efficiency can be achieved because there is no need to dispose of articles whose places of production have been falsely labeled.

In addition, in the supply chain system 1A according to the present modification, opening and fastening of the lock 31, which is opened and closed through an electronic process, are accumulated as histories. As a result, whether the lock 31 of the object storage 3A storing the article 4 has been opened during distribution can be determined. When the lock 31 has not been opened at all until a user who consumes or uses the article 4 opens the lock 31 and removes the article 4, therefore, it can be seen that the article 4 stored in the object storage 3A has not been tampered with.

Consequently, whether an unlawful act has been performed on the article 4 can be determined more accurately.

Third Modification

Although the object storage 3 or 3A is provided with the lock 31 and stores the article 4 in the above embodiment and the first and second modifications, the configuration of the object storage 3 or 3A is not limited to this. The object storage 3 or 3A may further include a sensor and continuously or regularly detect a storage state of the article 4.

That is, the object storage 3 or 3A may further include a sensor for detecting the storage state of the article 4 and notify, through wireless communication, the ledger management section 2011 of information indicating the storage state of the article 4 detected by the sensor. In this case, the ledger management section 2011 manages storage state histories of the article 4 by accumulating, as histories, information indicating the storage state of the article 4 transmitted from the object storage 3 or 3A. The sensor may be a sensor that detects the humidity, temperature, air pressure, or the like of the object storage 3 or 3A or may be a sensor that measures a shock given to the object storage 3 or 3A. Alternatively, the sensor may be a sensor that measures the sugar content of the article 4 stored in the object storage 3 or 3A, or may be a sensor obtained by combining some of the above-mentioned sensors. Any sensor may be used insofar as the sensor can detect the storage state of the article 4.

The information indicating the storage state may be, for example, information indicating presence or absence of the article 4. In this case, it can be seen that the article 4 is certainly stored in the object storage 3 or 3A. As a result, even when the object storage 3 or 3A is an opaque case, whether an unlawful act has been performed on the article 4, such as whether the article 4 has been tampered with, can be determined more easily.

If the article 4 is a food or the like and spoils over time, the information indicating the storage state may be information indicating quality. In this case, the quality of the article 4 can be checked as the storage state of the article 4, and whether the article 4 stored in the object storage 3 or 3A has spoiled can be determined. As a result, the supply chain system 1 or the like also achieves a function of tracing quality.

In addition, when the article 4 is easily deformable, the information indicating the storage state may be information indicating presence or absence of a change in shape. In this case, presence or absence of the shape of the article 4 can be checked as the storage state of the article 4, and whether the article 4 stored in the object storage 3 or 3A has spoiled can be determined. As a result, the supply chain system 1 or the like also achieves a function of tracing quality.

OTHER POSSIBLE EMBODIMENTS

Although the supply chain system and the like in the present disclosure have been described on the basis of the embodiment, a component or an apparatus that performs each process is not particularly limited. A processor or the like (described later) incorporated into a certain locally provided apparatus may perform each process, instead. Alternatively, a cloud server provided in a place different from a place where a local apparatus is provided may perform each process.

The present disclosure is not limited to the above embodiment. For example, another embodiment obtained by combining the components described herein with one another in any manner or excluding some of the above-described components may be established as an embodiment of the present disclosure. In addition, modifications obtained by modifying the above embodiment in various ways conceivable by those skilled in the art without deviating from the spirit of the present disclosure, that is, the meaning indicated by the text described in the claims, are also included in the present disclosure.

The present disclosure also includes the following cases.

(1) Each of the above-described apparatuses is specifically a computer system including a microprocessor, a read-only memory (ROM), a random-access memory (RAM), a hard disk unit, a display unit, a keyboard, and a mouse. The RAM or the hard disk unit stores a computer program. When the microprocessor operates in accordance with the computer program, each apparatus achieves the functions thereof. The computer program is obtained by combining a plurality of instruction codes for issuing commands to a computer in order to achieve certain functions.

(2) Some or all of each of the components of the above-described apparatuses may be achieved by a single system large-scale integration (LSI) circuit. The system LSI circuit is a super-multifunctional LSI circuit fabricated by integrating a plurality of components on a single chip and is specifically a computer system including a microprocessor, a ROM, and a RAM. The RAM stores the computer program. When the microprocessor operates in accordance with the computer program, the system LSI achieves functions thereof.

(3) Some or all of the components of each of the above-described apparatuses may be achieved by an integrated circuit (IC) card or a separate module removably attached to the apparatus. The IC card or the module is a computer system including a microprocessor, a ROM, and a RAM. The IC card or the module may include the super-multifunctional LSI. When the microprocessor operates in accordance with the computer program, the IC card or the module achieves functions thereof. The IC card or the module may be tamper-resistant.

(4) The present disclosure may be one of the above-described methods. The present disclosure may be a computer program that achieves one of these methods using a computer, or may be a digital signal including the computer program.

(5) The present disclosure may be a computer-readable recording medium storing the computer program or the digital signal, such as a flexible disk, a hard disk, a compact disc read-only memory (CD-ROM), a magneto-optical (MO) disk, a digital versatile disc (DVD), a DVD-ROM, a DVD-RAM, a Blu-ray disc (BD; registered trademark), or a semiconductor memory. The present disclosure may be the digital signal stored in the recording medium.

The present disclosure may be the computer program or the digital signal transmitted through an electrical communication line, a wireless or wired communication line, a network typified by the Internet, datacasting, or the like.

The present disclosure may be a computer system including a microprocessor and a memory. The memory may store the computer program, and the microprocessor may operate in accordance with the computer program.

The present disclosure may be implemented by another independent computer system by recording the program or the digital signal on the recording medium and transporting the recording medium or by transporting the program or the digital signal through the network or the like.

The present disclosure can be used in a supply chain system or the like for tracing distributed products, especially in a supply chain system or the like for tracing distributed products in order to detect unlawful acts such as false labeling of places of productions of foods and imitations of paintings and the like.

What is claimed is:

1. A device, comprising:
a processor; and
a memory storing a program that causes the processor to execute operations, the operations including:
receiving, from a first terminal of a first requester, an opening request for opening a lock provided in a container, in which a physical object is contained;
acquiring, from a first ledger, information of a first owner that has a right of ownership of the physical object when the opening request is received, the first ledger being one of distributed ledgers each having a same content;
determining whether the first requester matches the first owner; and
transmitting, to one of the first terminal or a second terminal when the first requester matches the first owner, a key configured to open the lock,
wherein each of the plurality of ledgers includes, for the physical object and chronologically in order, records of at least one second owner of the physical object, of each transfer of a right to open the lock, and of opening and fastening of the lock, and
upon opening of the lock by the first requester, the processor determines that the lock has not been opened at all during distribution from the at least one second owner to the first owner to see that the physical object has not been tampered with.

2. The device according to claim 1,
wherein the distributed ledgers are constructed on a blockchain platform.

3. The device according to claim 1,
wherein the distributed ledgers each have, as at least part of the same content, a history of the opening and the fastening of the lock, and
the operations further include:
causing, after the lock is open via the key, update information to be added to the history of the opening and the fastening in each of the distributed ledgers, the update information indicating that the lock has been opened.

4. The device according to claim 1,
wherein the operations further include:
receiving, from a second terminal of a second requester, a change request for changing the right of ownership of the physical object from a current owner to a next owner;
acquiring, from the first ledger, information of a second owner, as the current owner, that has the right of ownership of the physical object when the change request is received;
determining whether the second requester matches the second owner; and
causing, when the second requester matches the second owner, update information to be recorded in each of the distributed ledgers, the update information indicating that the right of ownership is changed from the second owner to the next owner.

5. The device according to claim 4,
wherein the distributed ledgers each have, as at least part of the same content, a change history of owners that have the right of ownership of the physical object, and the update information is added to the change history in each of the distributed ledgers.

6. The device according to claim 4,
wherein the next owner is the first owner, and
the physical object is transferred from the second owner to the first owner through changing of the right of ownership and opening of the lock.

7. A system, comprising:
the container including the lock and the device according to claim 1; and
a server that manages the first ledger.

8. The system according to claim 7,
wherein the server performs second operations including:
receiving, from a third terminal of a second requester, a change request for changing the right of ownership of the physical object from a current owner to a next owner;
acquiring, from the first ledger, information of a second owner, as the current owner, that has the right of ownership of the physical object when the change request is received;
determining whether the second requester matches the second owner; and
causing, when the second requester matches the second owner, update information to be recorded in each of the distributed ledgers, the update information indicating that the right of ownership is changed from the second owner to the next owner.

9. The system according to claim 8,
wherein the distributed ledgers each have, as at least part of the same content, a change history of owners that have the right of ownership of the physical object, and
the update information is added to the change history in each of the distributed ledgers.

10. The system according to claim 8,
wherein the next owner is the first owner, and
the physical object is transferred from the second owner to the first owner thorough changing of the right of ownership and opening of the lock.

11. The system according to claim 7, wherein
the device receives the opening request from the first terminal via the server.

12. The system according to claim 7, wherein
the server is configured to receive, from the container through wireless communication, a notification indicating that the lock has been opened.

13. The system according to claim 7,
wherein the container includes a transparent case, an opaque latticed case, or a barred case.

14. The system according to claim 7,
wherein the distributed ledgers each have, as at least part of the same content, a history of a state of the physical object, and
the operations further include:
detecting, by a sensor included in the container, a current state of the physical object;
receiving, from the container, state information indicating the current state of the physical object; and
causing the state information to be added to the history of the state of the physical object in each of the distributed ledgers.

15. The system according to claim 7,
wherein the distributed ledgers are constructed on a blockchain platform.

16. A system, comprising:
the container including the lock; and
a server that manages the first ledger and includes the device according to claim 1.

17. The system according to claim 16,
wherein the system performs second operations including:
making, when the first requester matches the first owner and as the key, an electronic key of the lock available for the first owner, and
the lock is opened with the electronic key.

18. The system according to claim 16, wherein the system performs second operations including:
transmitting, to the first terminal as the key, an electronic key for opening the lock, and
the container causes, when the first owner makes the first terminal come into contact with or approaches the lock, the lock to be opened via a wireless near-field communication between the first terminal and the container.

19. A computer-implemented method, comprising:
receiving, from a first terminal of a requester, an opening request for opening a lock provided in a container, in which a physical object is contained;
acquiring, from a first ledger, information of a current owner having a right of ownership of the physical object when the opening request is received, the first ledger being one of distributed ledgers each having a same content;
determining whether the requester matches the current owner; and
transmitting, to one of the first terminal or a second terminal when the requester matches the current owner, a key configured to open the lock,
wherein each of the plurality of ledgers includes, for the physical object and chronologically in order, records of at least one previous owner of the physical object, of each transfer of a right to open the lock, and of opening and fastening of the lock, and
upon opening of the lock by the requester, the computer-implemented method determines that the lock has not been opened at all during distribution from the at least one previous owner to the current owner to see that the physical object has not been tampered with.

20. A device, comprising:
a processor; and
a memory storing a program that causes the processor to execute operations, the operations including:
receiving, from a first terminal of a first requester, a change request for changing a right of ownership of a physical object from a current owner to a next owner,
acquiring, from a first ledger, information of the current owner, the first ledger being one of distributed ledgers each having a same content,
determining whether the first requester matches the current owner, and
causing, when the first requester matches the current owner, first update information to be recorded in each of the distributed ledgers, the first update information indicating that the right of ownership is changed to the next owner,
wherein, after the first update information is recorded in each of the distributed ledgers, upon receipt of an opening request from a second requester and a determination that the second requester matches the next owner, a key configured to open a lock of a container in which the physical object is contained is transmit to a second terminal of the second requestor,
each of the plurality of ledgers includes, for the physical object and chronologically in order, records of at least the current owner and the next owner of the physical object, of each transfer of a right to open the lock, and of opening and fastening of the lock, and
upon opening of the lock by the second requester, the processor determines that the lock has not been opened at all during distribution from the current owner to the next owner to see that the physical object has not been tampered with.

21. The device according to claim 20,
wherein the distributed ledgers each have, as at least part of the same content, a history of the opening and the fastening of the lock provided in the container, in which the physical object is contained, and
the operations further include:
receiving, from the container, a notification indicating that the lock has been opened; and
causing, when the notification is received, update information to be added to the history of locking and unlocking in each of the distributed ledgers, the update information indicating that the lock has been opened.

22. A non-transitory computer-readable recording medium storing a program that, when executed by a computer, causes the computer to perform operations, the operations comprising:
receiving, from a first terminal of a requester, an opening request for opening a lock provided in a container, in which a physical object is contained;
acquiring, from a first ledger, information of a current owner having a right of ownership of the physical object when the opening request is received, the first ledger being one of distributed ledgers each having a same content;
determining whether the requester matches the current owner; and
transmitting, to one of the first terminal or a second terminal when the requester matches the current owner, a key configured to open the lock,
wherein each of the plurality of ledgers includes, for the physical object and chronologically in order, records of at least one previous owner of the physical object, of each transfer of a right to open the lock, and of opening and fastening of the lock, and
upon opening of the lock by the requester, the computer determines that the lock has not been opened at all during distribution from the at least one previous owner to the current owner to see that the physical object has not been tampered with.

* * * * *